US007421660B2

(12) United States Patent
Charnock et al.

(10) Patent No.: US 7,421,660 B2
(45) Date of Patent: Sep. 2, 2008

(54) METHOD AND APPARATUS TO VISUALLY PRESENT DISCUSSIONS FOR DATA MINING PURPOSES

(75) Inventors: Elizabeth Charnock, Foster City, CA (US); Curtis Thompson, Berkeley, CA (US); Steven L Roberts, Foster City, CA (US)

(73) Assignee: Cataphora, Inc., Redwood City, CA (US)

( * ) Notice: Subject to any disclaimer, the term of this patent is extended or adjusted under 35 U.S.C. 154(b) by 741 days.

(21) Appl. No.: 10/358,786

(22) Filed: Feb. 4, 2003

(65) Prior Publication Data

US 2004/0153456 A1 Aug. 5, 2004

(51) Int. Cl.
G06F 3/00 (2006.01)
G06F 9/00 (2006.01)
G06F 17/00 (2006.01)

(52) U.S. Cl. ............... 715/751; 715/758; 715/839; 715/853; 715/706; 715/963; 715/968; 715/838; 715/759; 715/753; 715/757; 705/7; 705/8; 707/3

(58) Field of Classification Search ........... 715/751, 715/839, 963, 968, 853, 838, 758, 759, 753, 715/755, 757, 706; 705/7, 8
See application file for complete search history.

(56) References Cited

U.S. PATENT DOCUMENTS

| | | | |
|---|---|---|---|
| 5,689,550 A | 11/1997 | Garson et al. | |
| 5,754,939 A | 5/1998 | Herz et al. | |
| 5,796,395 A * | 8/1998 | de Hond | 715/751 |
| 5,880,731 A * | 3/1999 | Liles et al. | 715/758 |
| 6,188,405 B1 * | 2/2001 | Czerwinski et al. | 715/764 |
| 6,209,100 B1 | 3/2001 | Robertson et al. | |
| 6,275,811 B1 | 8/2001 | Ginn | |
| 6,311,194 B1 | 10/2001 | Sheth et al. | |
| 6,381,579 B1 | 4/2002 | Gervais et al. | |
| 6,396,509 B1 * | 5/2002 | Cheng | 715/706 |
| 6,476,830 B1 * | 11/2002 | Farmer et al. | 715/769 |
| 6,484,196 B1 * | 11/2002 | Maurille | 709/206 |
| 6,539,421 B1 * | 3/2003 | Appelman et al. | 709/206 |
| 6,598,046 B1 | 7/2003 | Goldberg et al. | |
| 6,631,375 B2 | 10/2003 | Jecha et al. | |

(Continued)

FOREIGN PATENT DOCUMENTS

WO WO 00/67159 11/2000

(Continued)

OTHER PUBLICATIONS

Wellman, Barry, "For a Social Network Analysis of Computer Networks: A Sociological Perspective on Collaborative Work and Virtual Community", 1996, ACM, p. 1-11.

(Continued)

*Primary Examiner*—Tadesse Hailu
*Assistant Examiner*—Sabrina Greene
(74) *Attorney, Agent, or Firm*—Alan H. MacPherson; MacPherson Kwok Chen & Heid LLP

(57) ABSTRACT

A method of organizing information is disclosed. The method comprises providing a visualization of actor communications in the context of one or more discussion, a discussion including at least one actor and at least one documented communication.

11 Claims, 42 Drawing Sheets

U.S. PATENT DOCUMENTS

| | | |
|---|---|---|
| 6,654,726 B1 | 11/2003 | Hanzek |
| 6,654,749 B1 | 11/2003 | Nashed |
| 6,728,752 B1 | 4/2004 | Chen et al. |
| 6,910,186 B2* | 6/2005 | Kim .......................... 715/706 |
| 2001/0018698 A1 | 8/2001 | Uchino |
| 2001/0048449 A1* | 12/2001 | Baker ......................... 345/758 |
| 2002/0089532 A1* | 7/2002 | Cohen et al. ................ 345/736 |
| 2002/0116470 A1 | 8/2002 | Dyer et al. |
| 2002/0161800 A1 | 10/2002 | Eld et al. |
| 2003/0115481 A1 | 6/2003 | Baird et al. |
| 2004/0205643 A1 | 10/2004 | Harrington |

FOREIGN PATENT DOCUMENTS

| | | |
|---|---|---|
| WO | WO 01/53995 A1 | 7/2001 |
| WO | WO 01/57633 A1 | 8/2001 |
| WO | WO 01/69428 A1 | 9/2001 |

OTHER PUBLICATIONS

ISR from PCT/US03/03309 date of mailing May 1, 2003 (4 pages).

International Search Report from PCT (corresponding case No. PCT/US03/03504) dated Apr. 21, 2003.

Song, W.W. et al., "A Semantic Similarity Approach to electronic document modeling and integration", Web Information Systems Engineering, 2000Proceedings of the First International Conferences on Hong Kong, China Jun. 19-21, 2000, Los Alamitos, CA, USA, IEEE Comput. Soc., US, vol. 1, Jun. 19, 2000, pp. 116-124, XP010521844 ISBN: 0-7695-0577-5.

Varlamis, I. et al. "Web document searching using enhanced flyperlink semantics based on xml" Database Engineering & Applications, 2001 International Symposium on Jul. 16-18, 2001, Piscataway, NJ, USA, IEEE, pp. 34-44, XP010554365.

Dunkel B. et al, "Customized metadata for Internet Information" Knowledge-Based Intelligent Electronic Systems, 1997. KES '97. Proceedings., 1997 First International COnference on Aldelaide, SA Australia May 21-23, 1997, New York, NY, USA, IEEE US, vol. 2, May 21, 1997, pp. 508-516, XP010242741, ISBN: 0-7803-3755-7.

Katashi Nagao Ed; Akito Sakurai et al, "Discussion Mining: Knowledge Discovery from Semantically Annotated Discussion Content"; New Frontiers in Artificial Intelligence Lecture notes in COmputer Science; LNCS, Springer Berlin Heidelberg, BE, vol. 3609, 1900, pp. 158-168, XP019055847; ISBN: 978-3-540-71008-0.

Smith M A Et Al Association For Computing Machinery: "Visualization Components For Persistent Conversations" Chi 2001 Conference Proceedings. Conference On Human Factors In Computing Systems. Seattle, Wa, Mar. 31- Apr. 5, 2001, Chi Conference Proceedings. Human Factors In Computing Systems, New York, Ny: Ieee,US, Mar. 31, 2001 (Mar. 3, 2001), pp. 136-143, Isbn: 1-28113-327-8 Abstract; Figures 3-6 p.141-p. 143.

Warren Sack: "Conversation Map: A Content-Based Newsgroup Brower" Proceedings Of The 5th International Conference On Intelligent User Interfaces, [Onl lne] 2000. pp. 233-240, New Orleans, Usa Isbn: 1-58113-134-8 Retrieved From The Internet: Url: Http://Portal.Acm. Abstract* p. 234 [Retrieved p. 237 On Feb. 14, 2008].

Donath J Et Al: "Visualizing Conversation" Systems Sciences, 1999, Hicss-32. Proceedings Of The 32nd Annual Hawaii International Conference On Maui, Hi, Usa Jan 5-8, 1999, Los Alamitos, Ca, Usa, Ieee Comput.

* cited by examiner

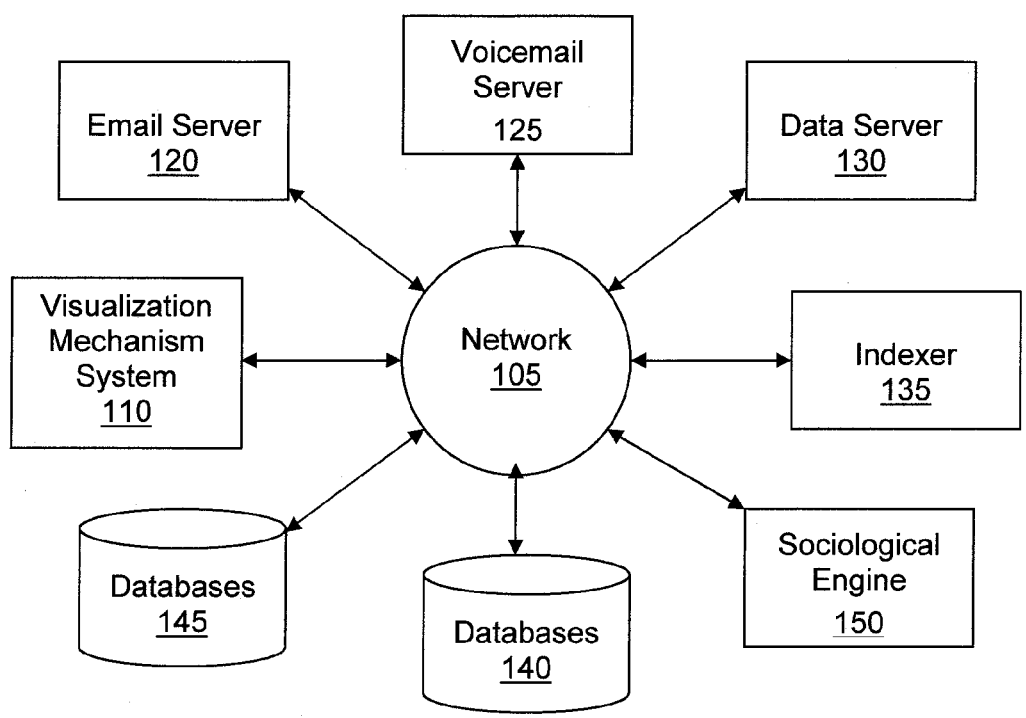
Figure 1: Example of a computer network

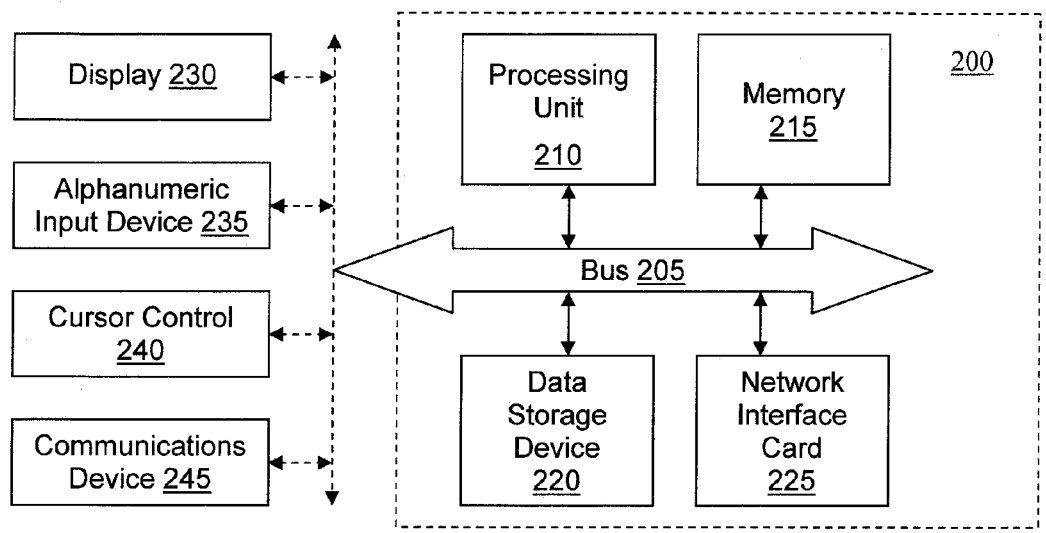
Figure 2: Example of a digital computer

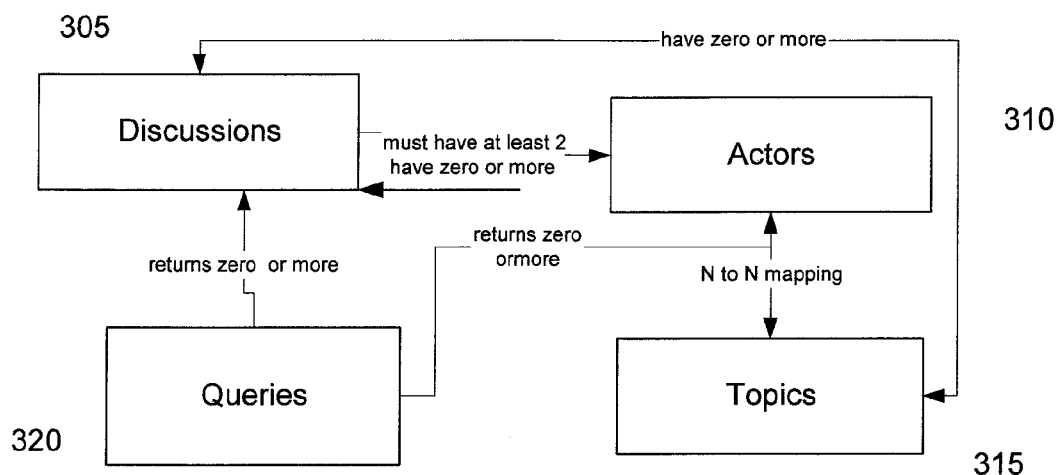
Figure 3: Navigation flow

Figure 4: User-interface flow
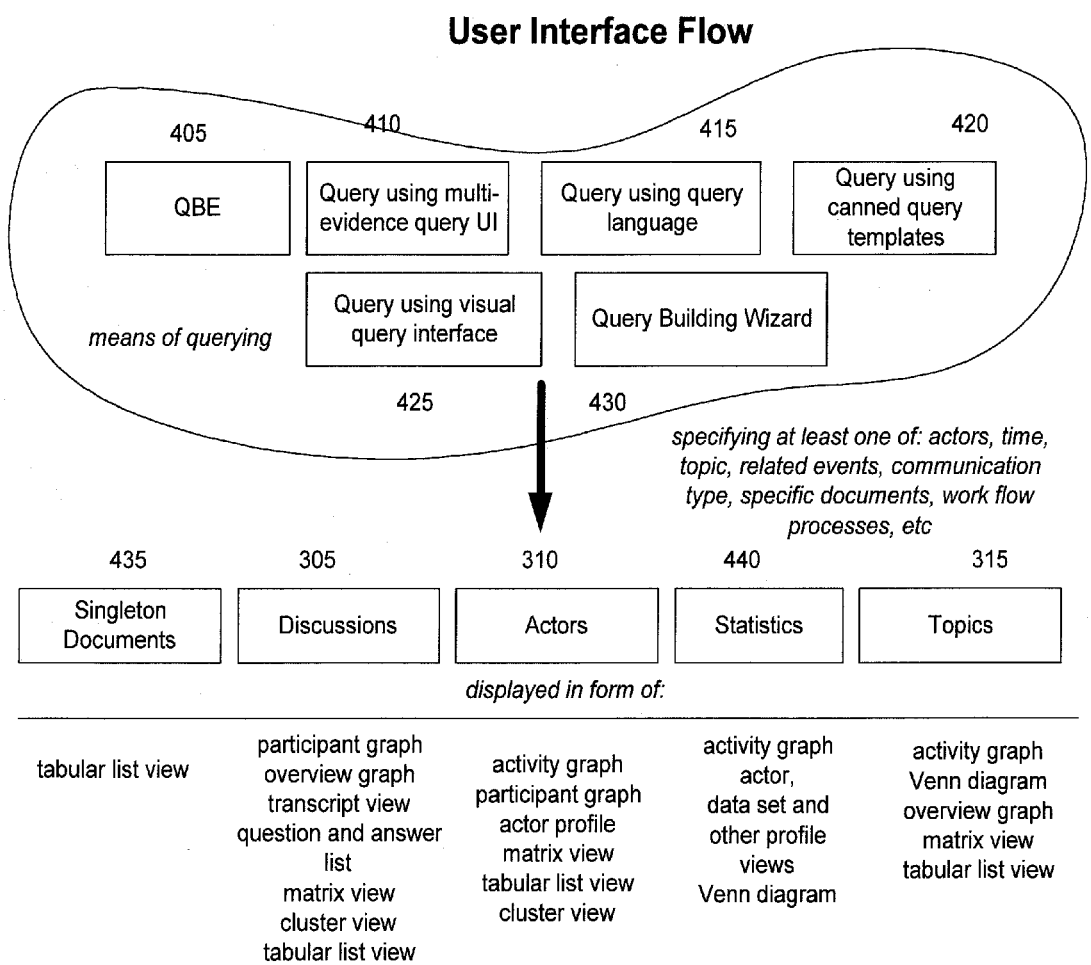

Figure 5: Participant graph
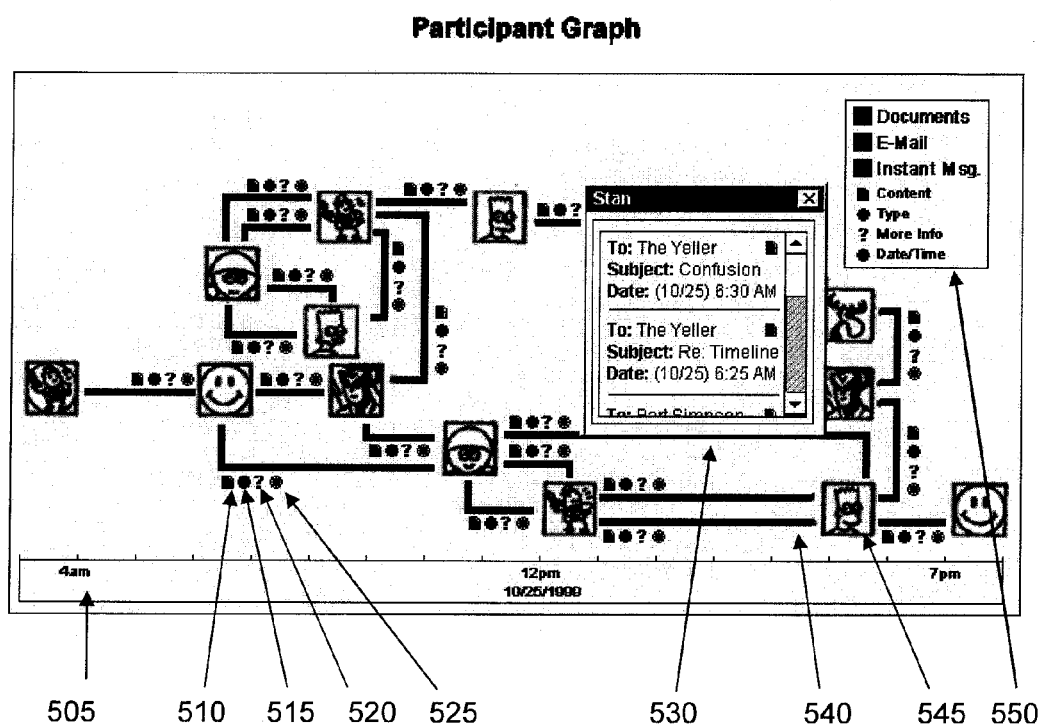

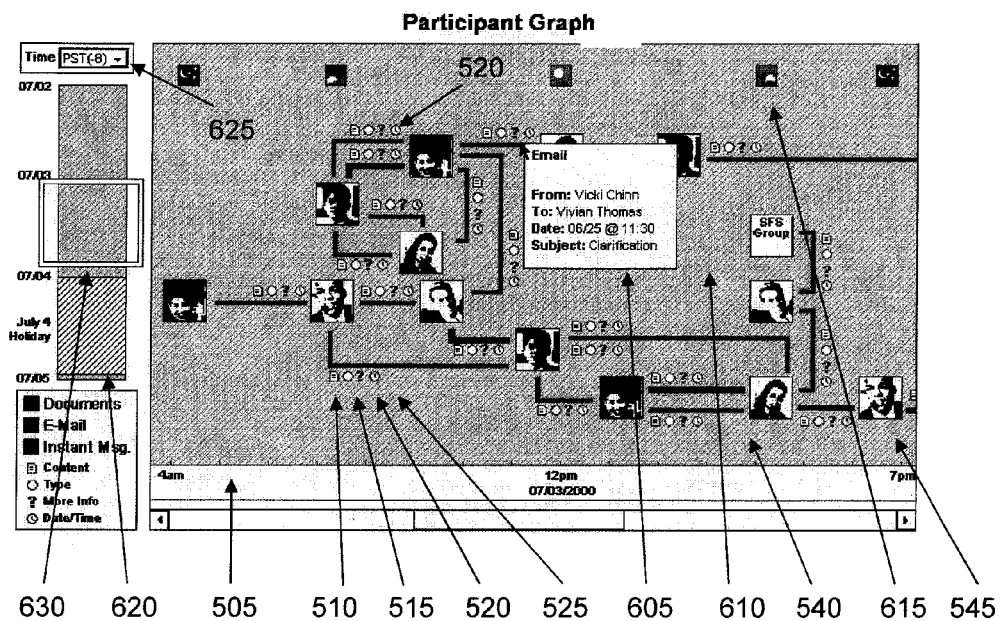
Figure 6: Participant graph, daytime and nighttime view

Figure 7: form panel for adding items
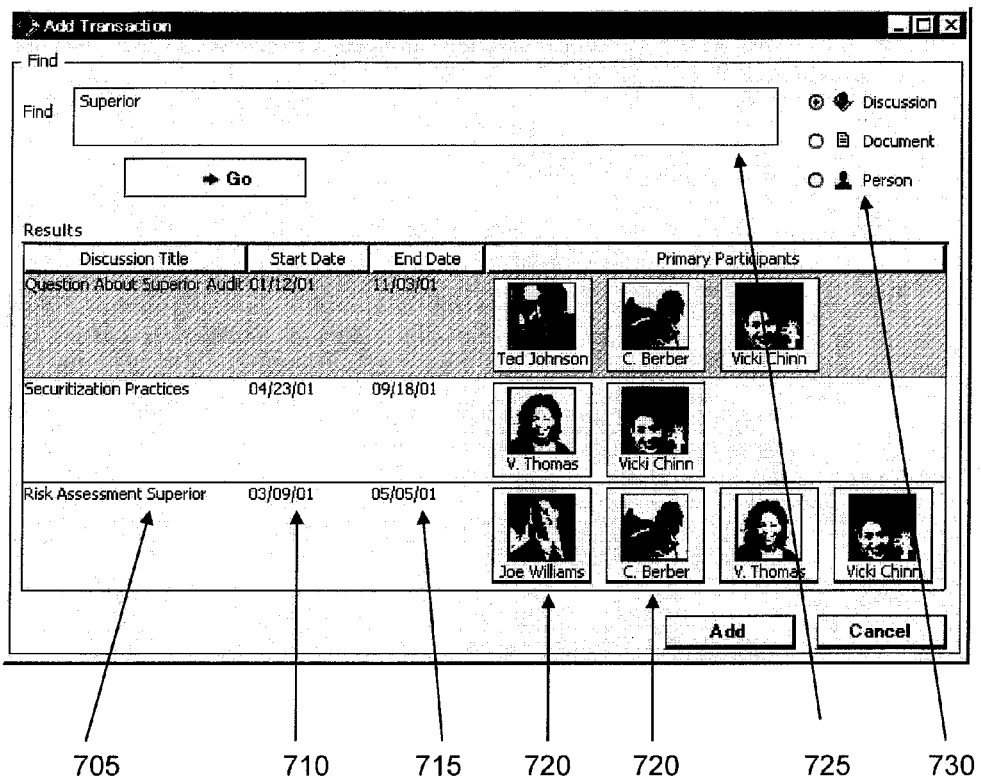

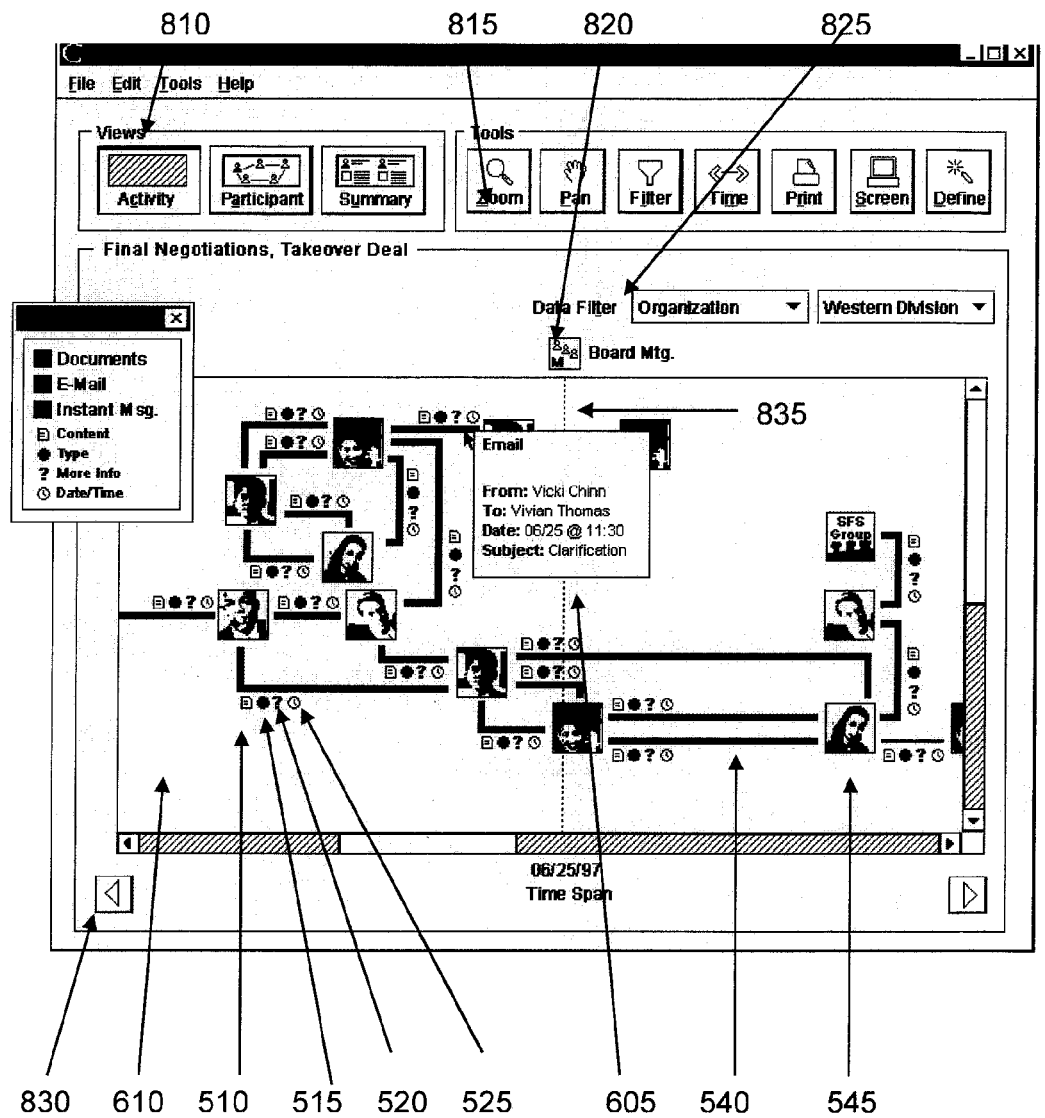
Figure 8: Participant graph, with pop-up showing basic information about the item

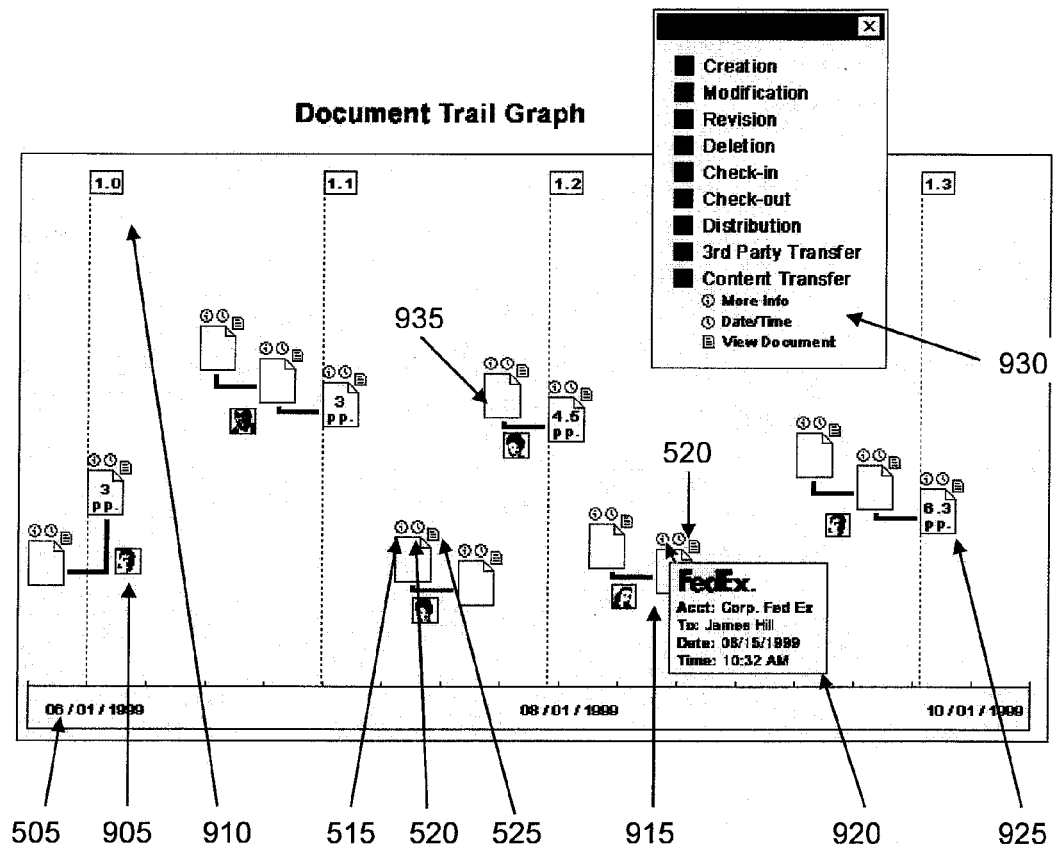
Figure 9: Document trail graph

Figure 10: Money trail graph
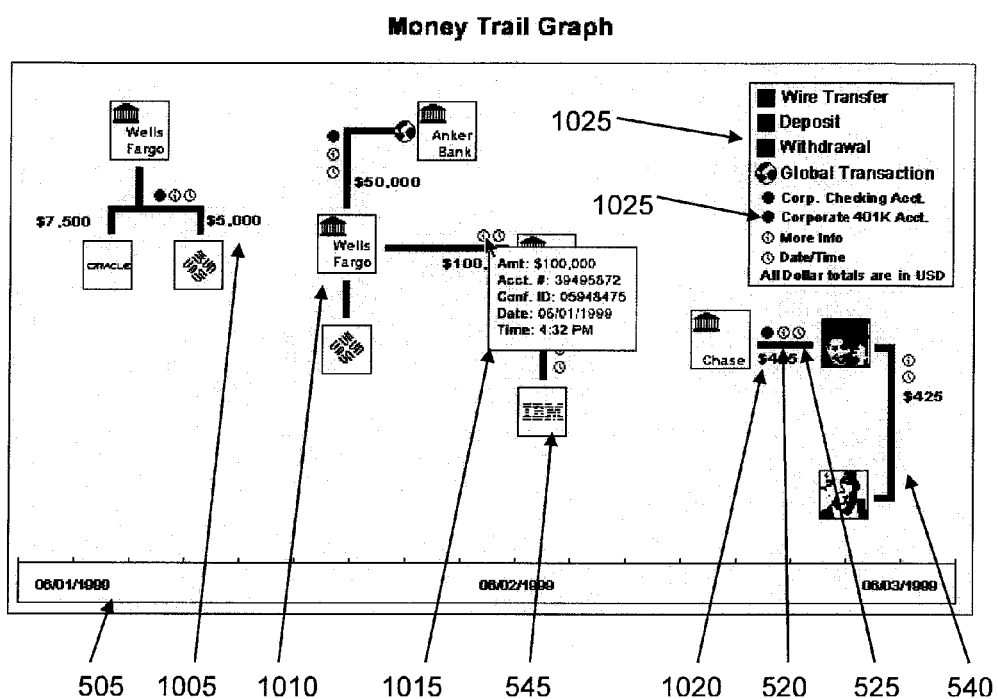

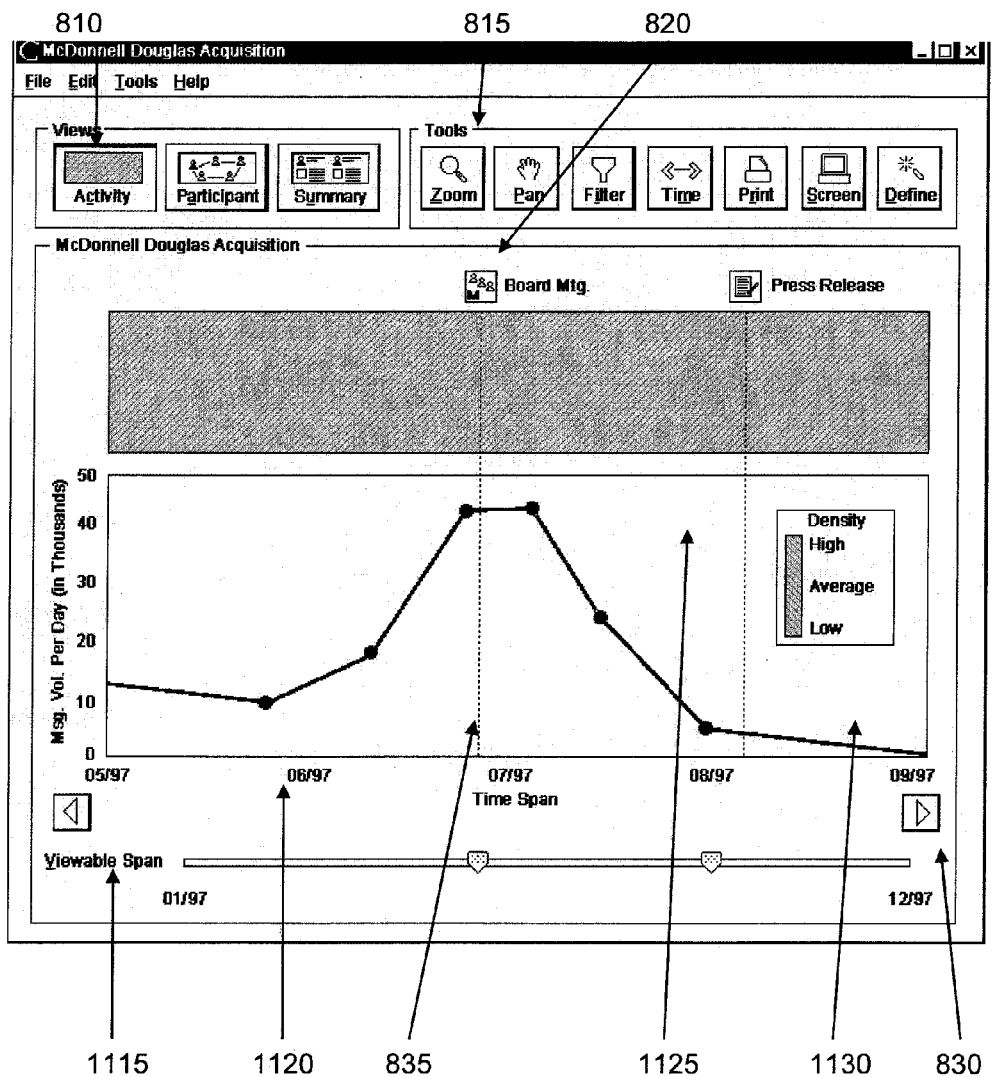
Figure 11: Rainbow view

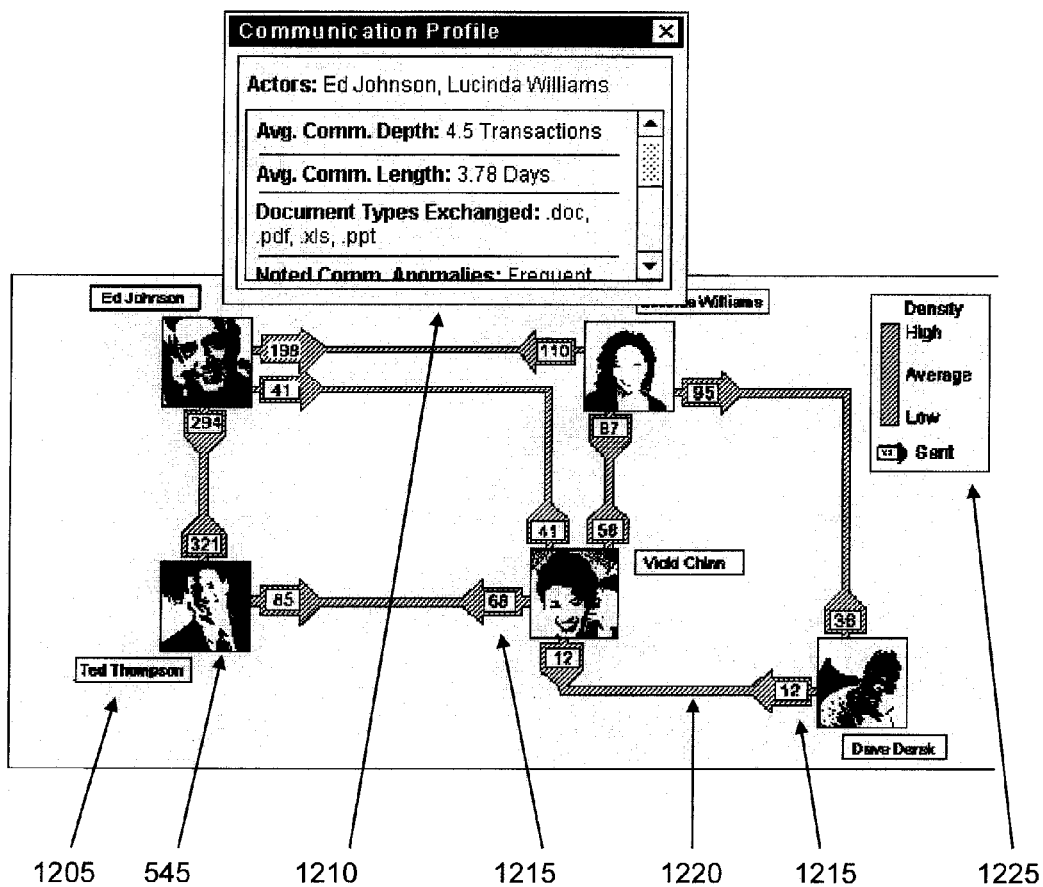
Figure 12: Activity graph

Figure 13: Discussion timeline
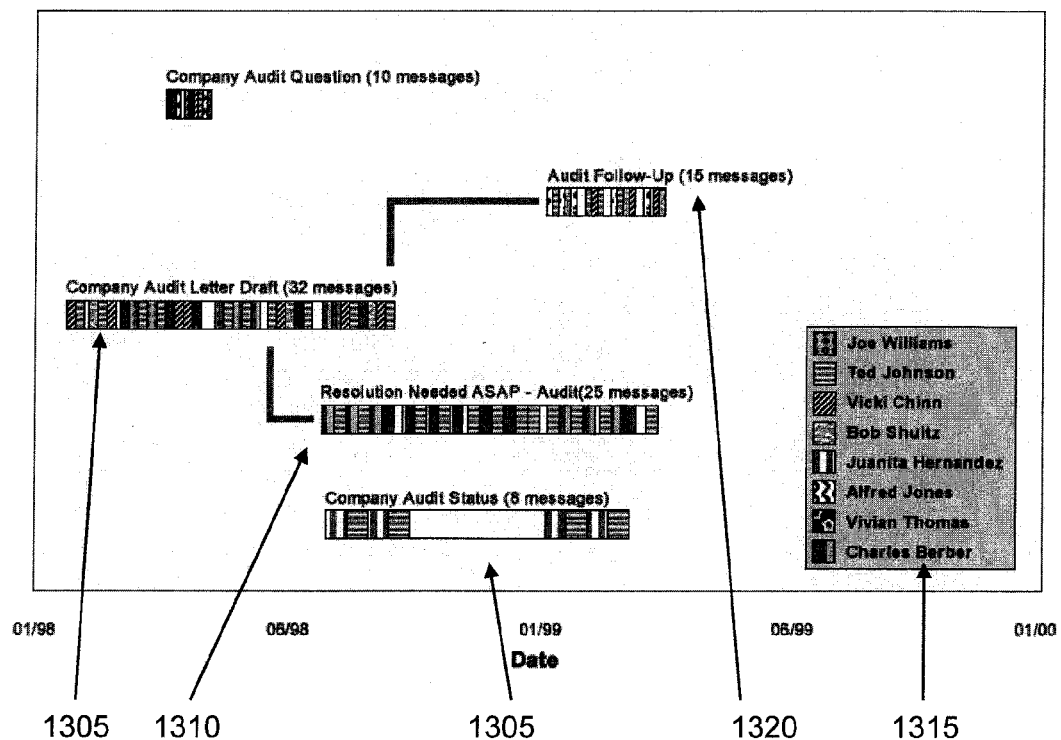

Figure 14: Discussion timeline with spider-eye panning widget
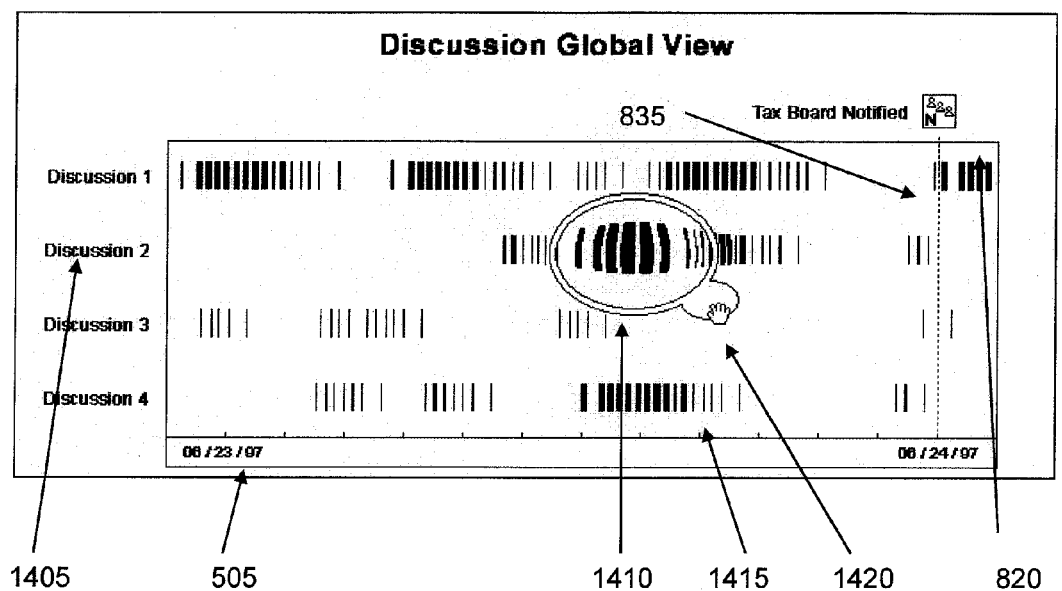

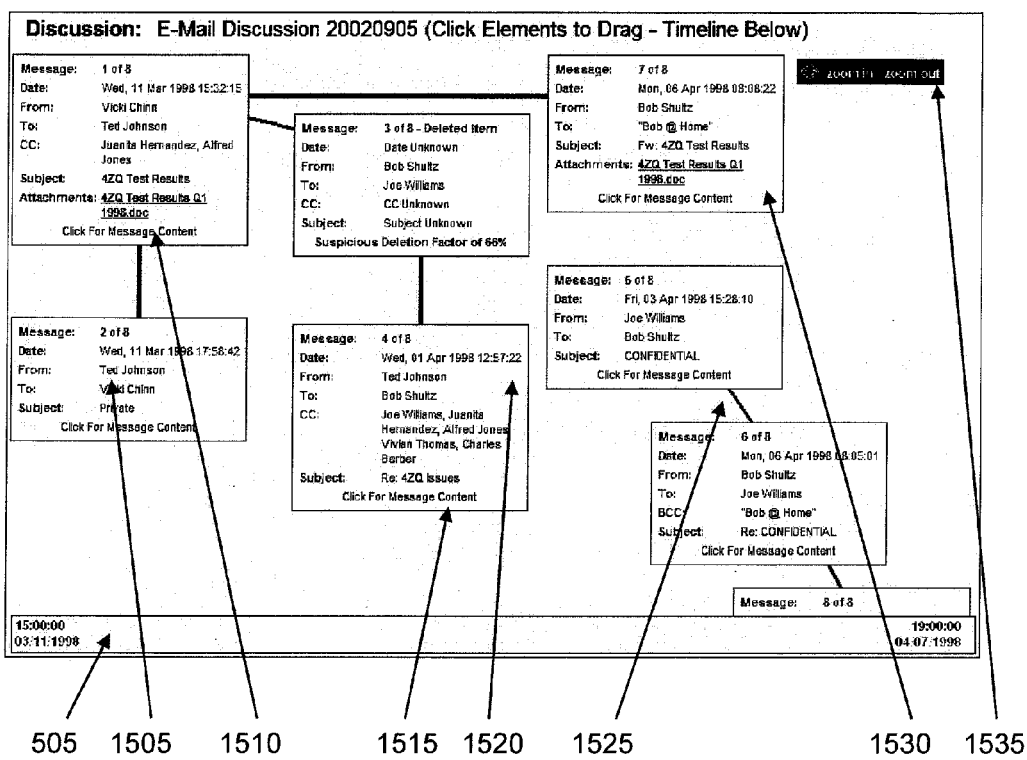
Figure 15: Discussion timeline showing individual events

Figure 16: Cluster view
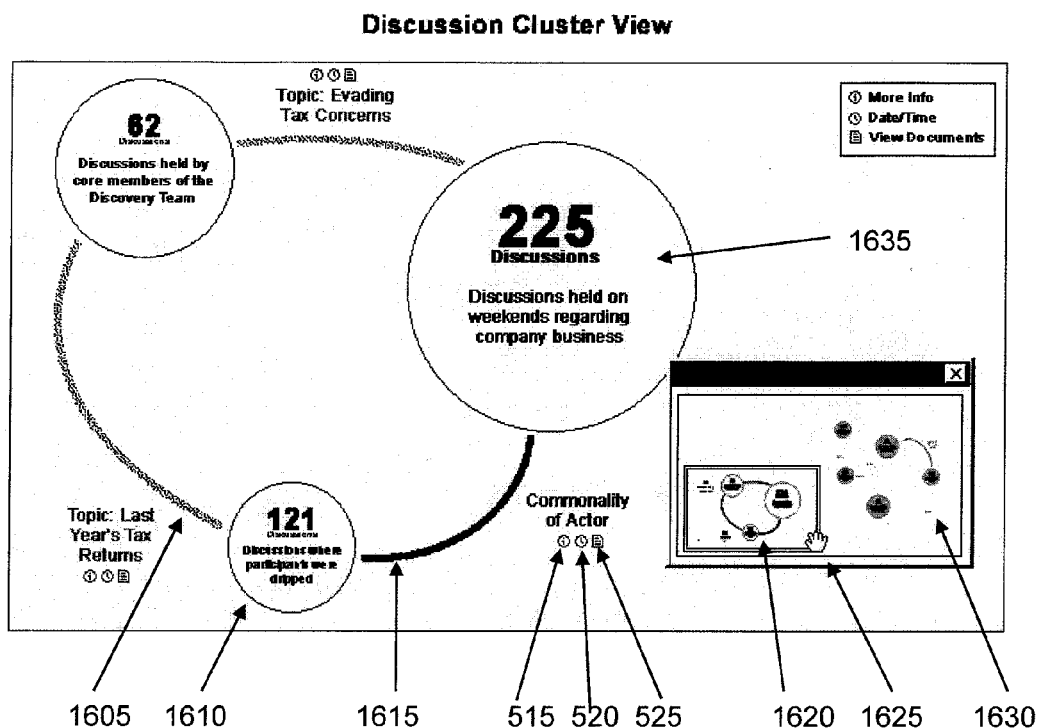

Figure 17: Graphical Representation of Discussion Timeline
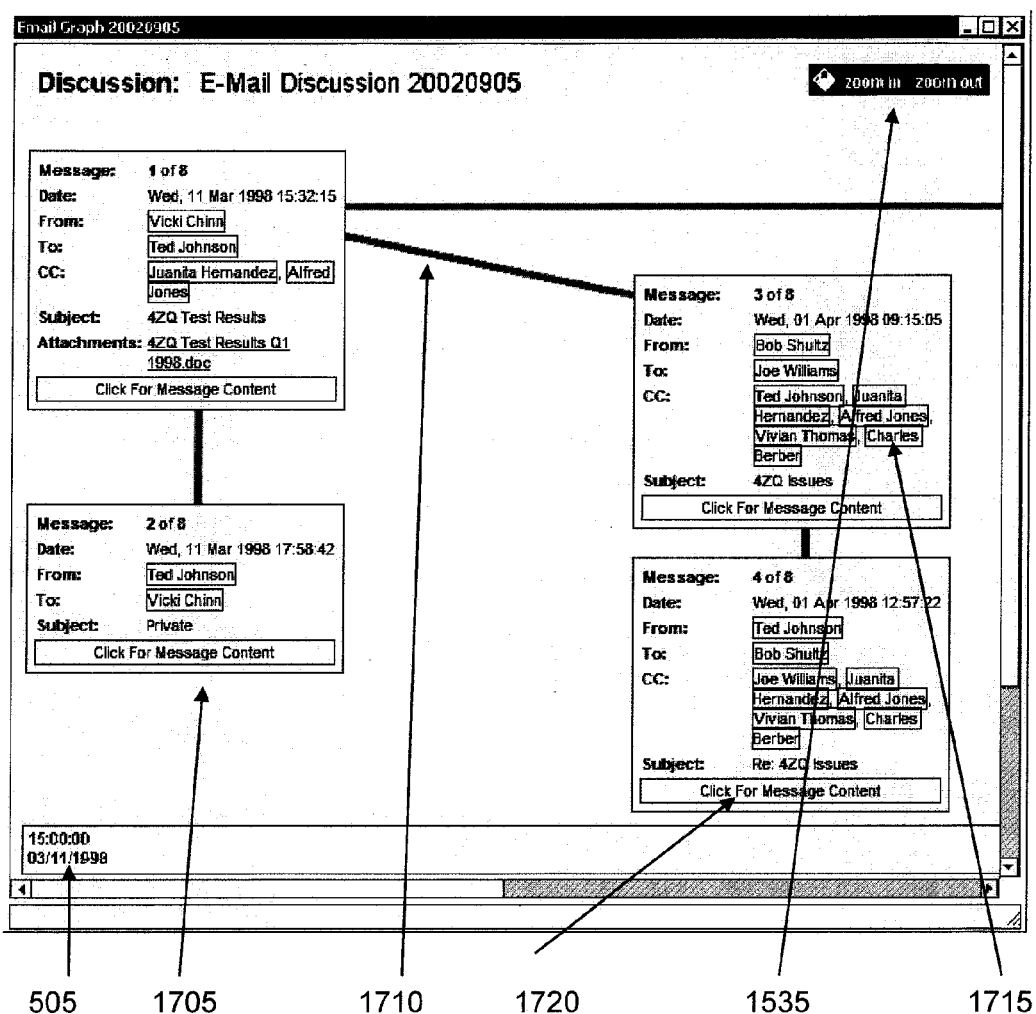

Figure 18: Transcript view, showing actor color-coding
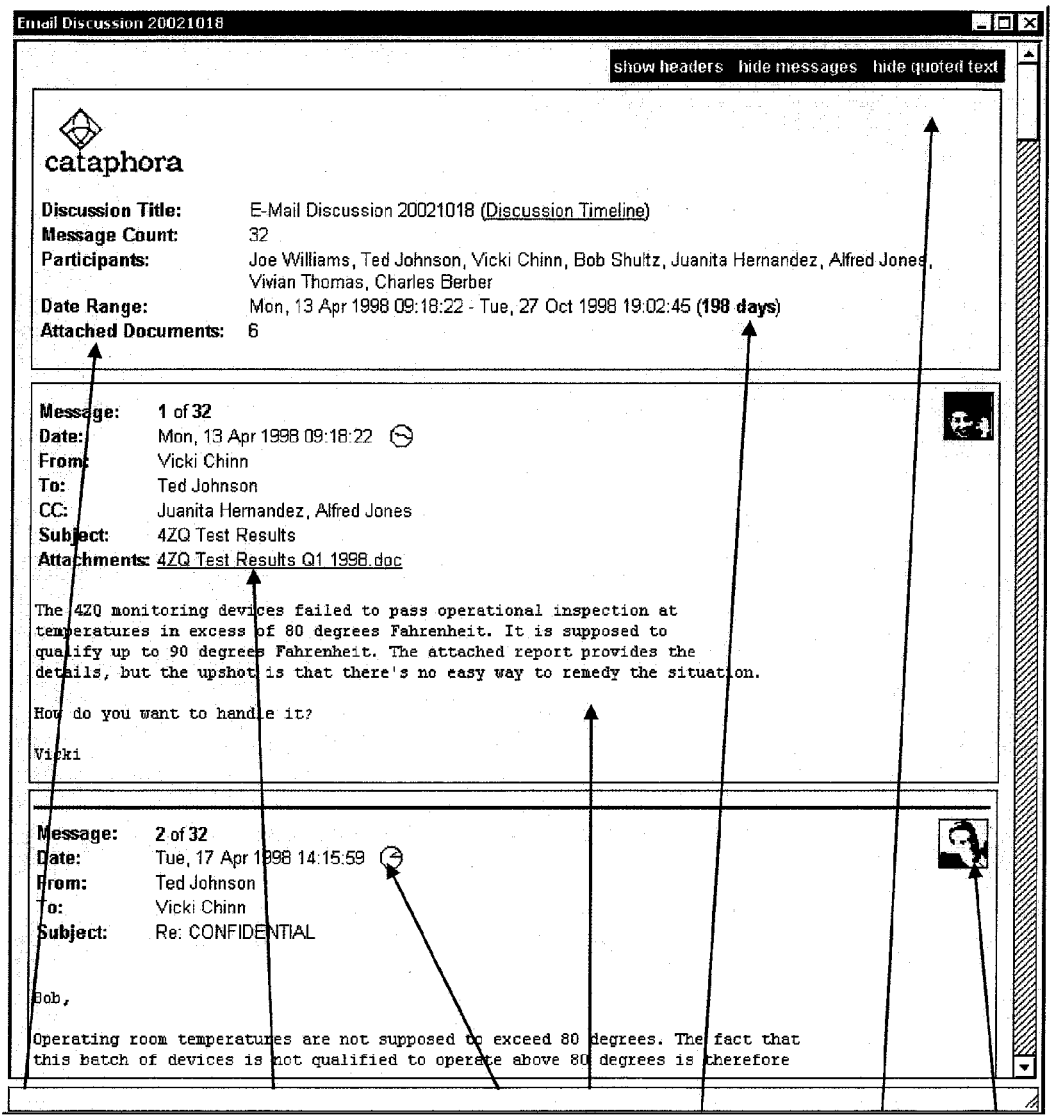

Figure 19: Transcript view, showing actor activity
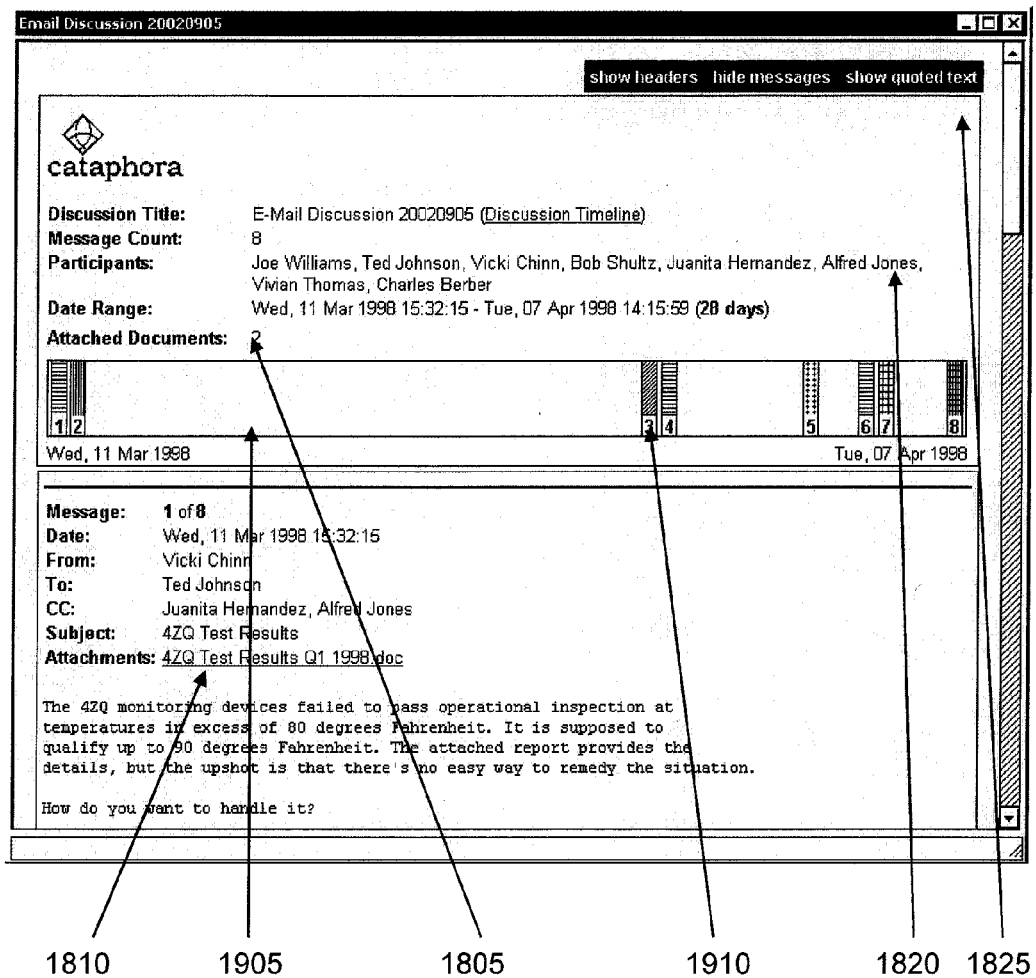

Figure 20: Transcript view, showing discussion partitions
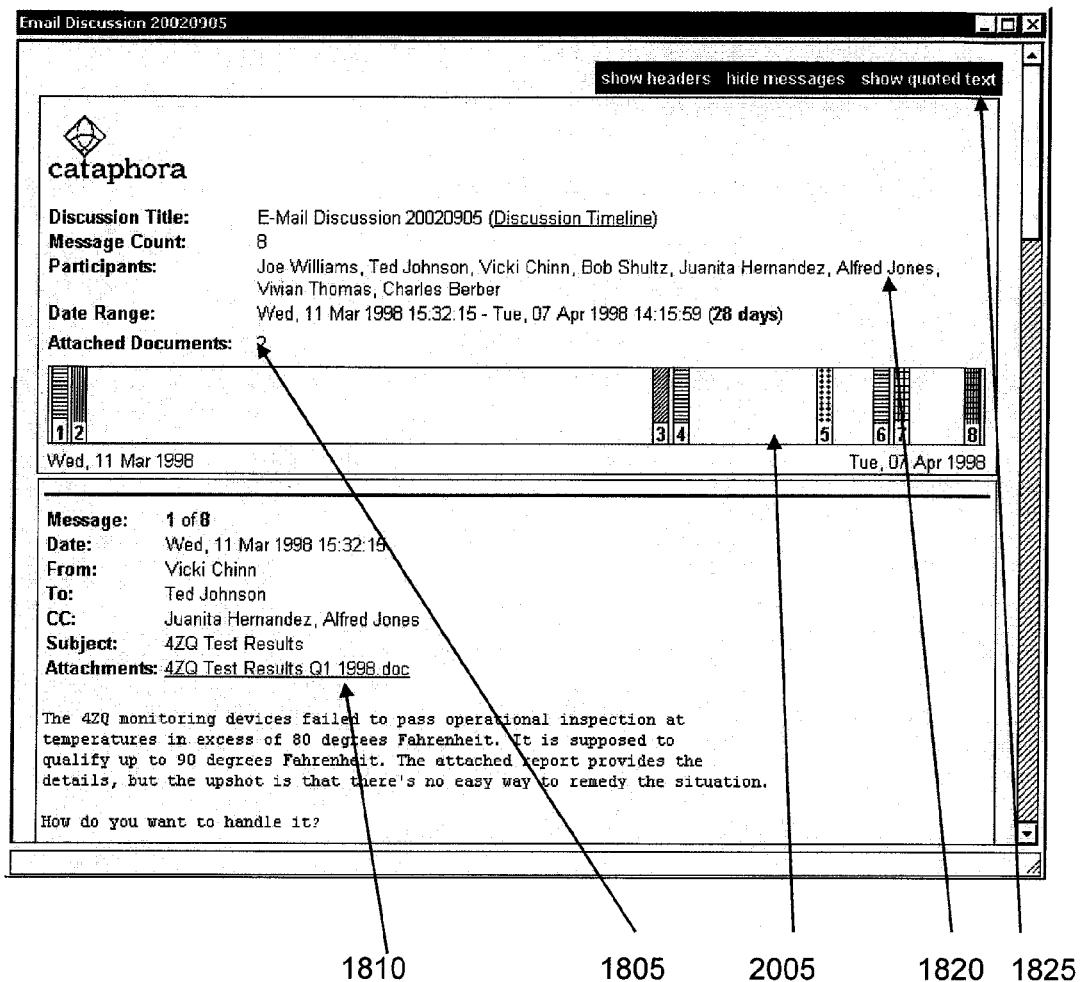

Figure 21: Transcript view, showing document type color-coding
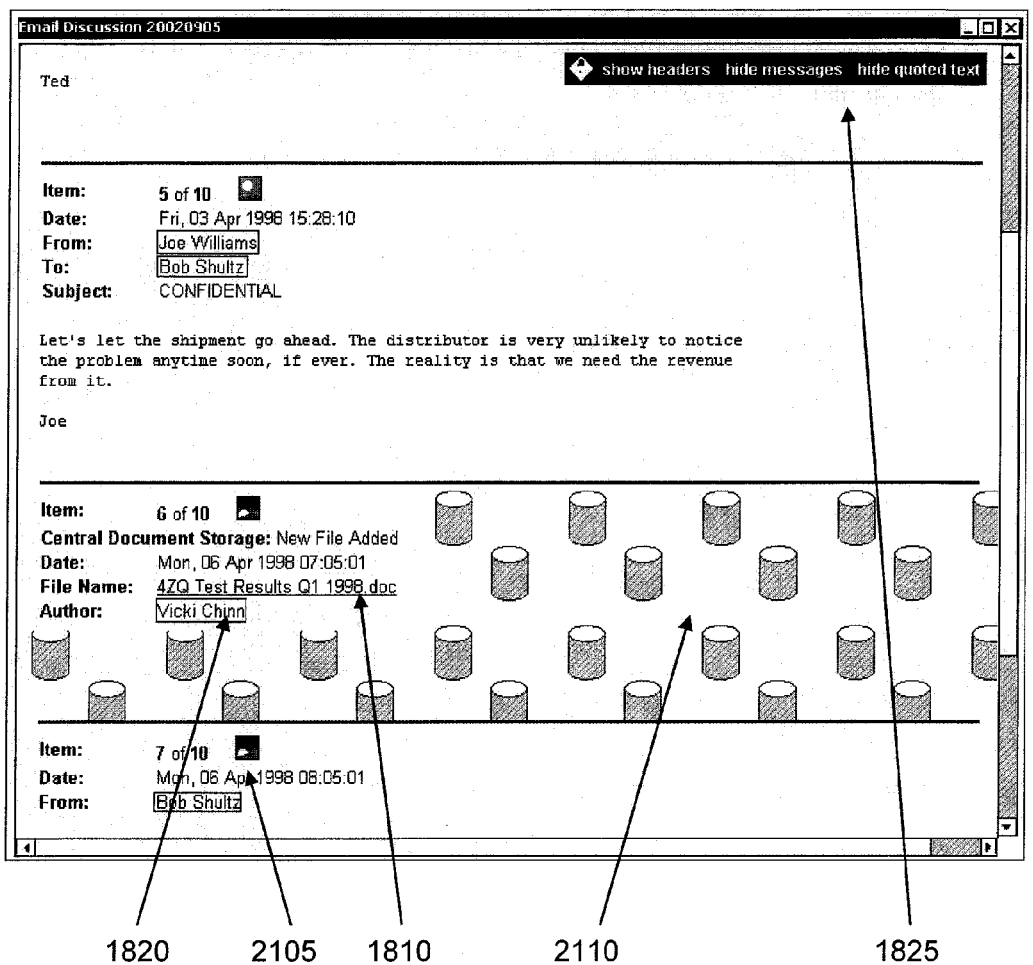

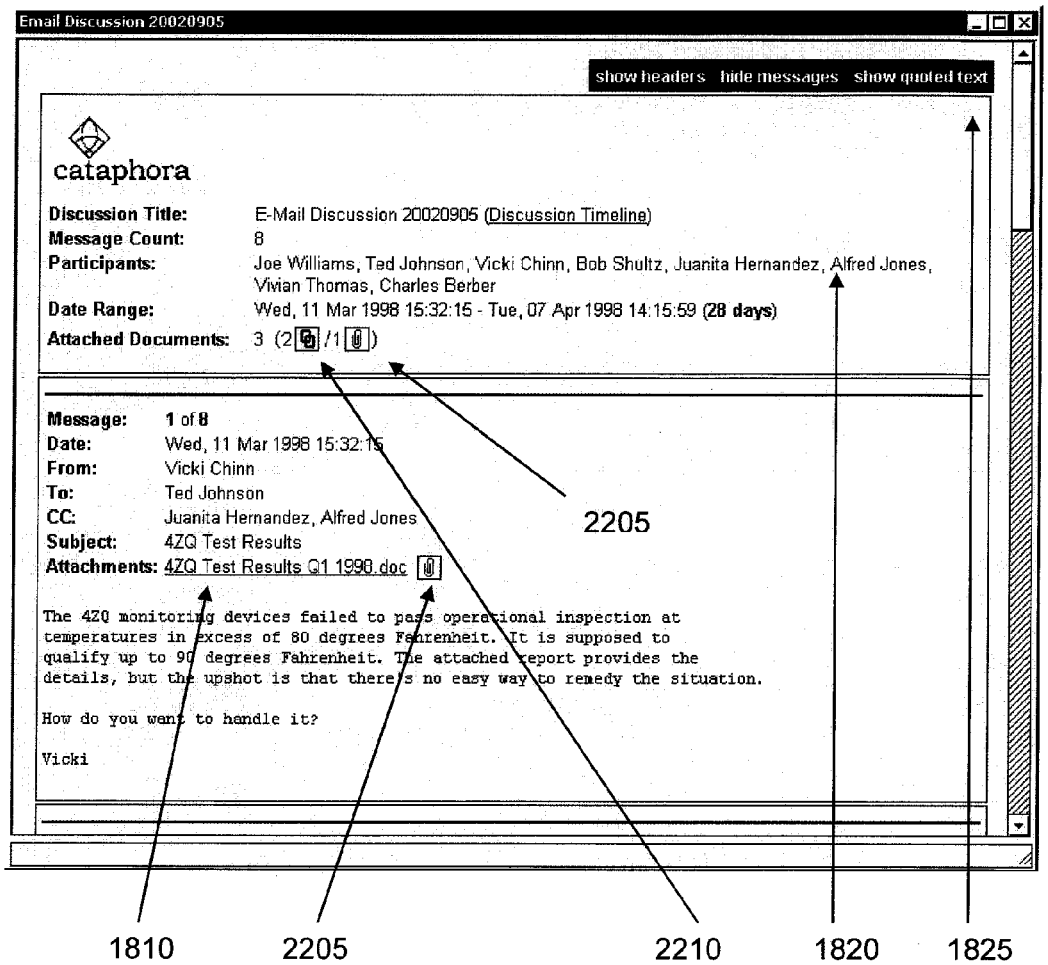
Figure 22: Transcript view, showing attachments

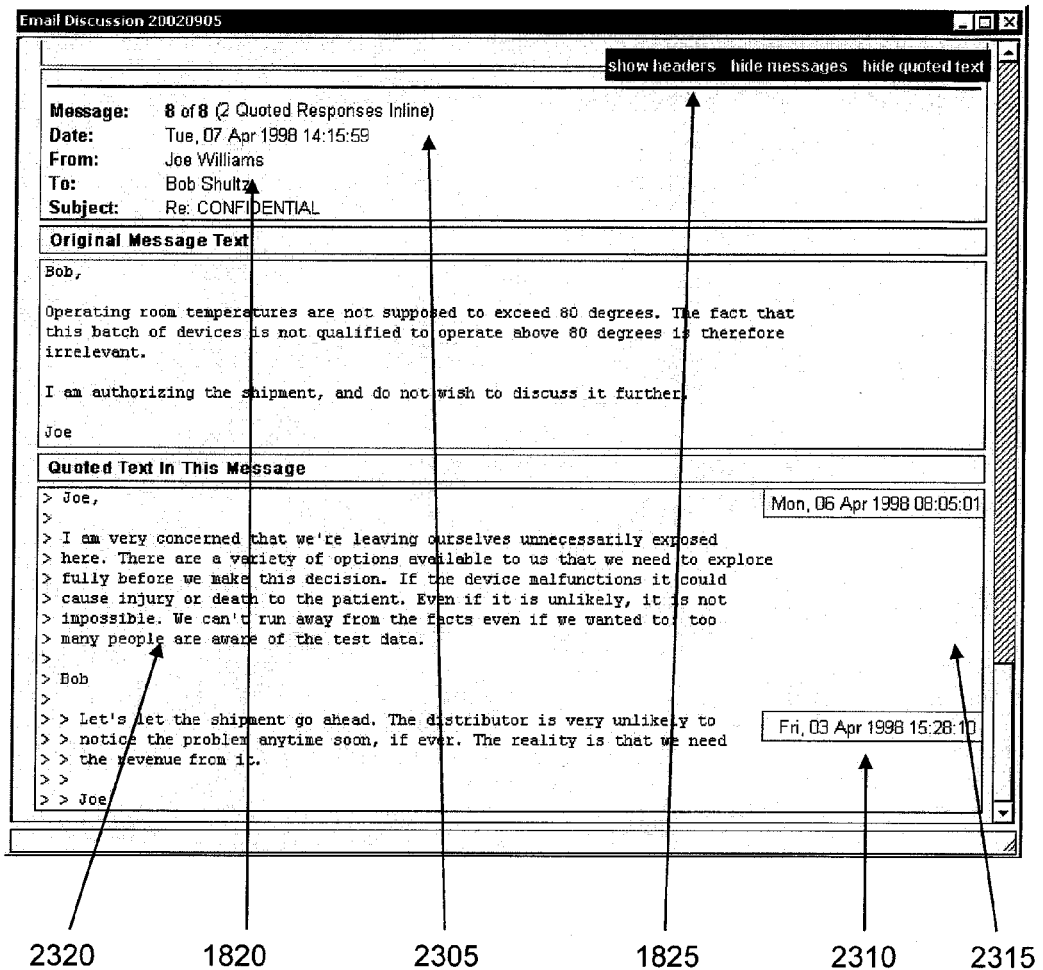
Figure 23: Transcript view, showing color-coding of quoted text

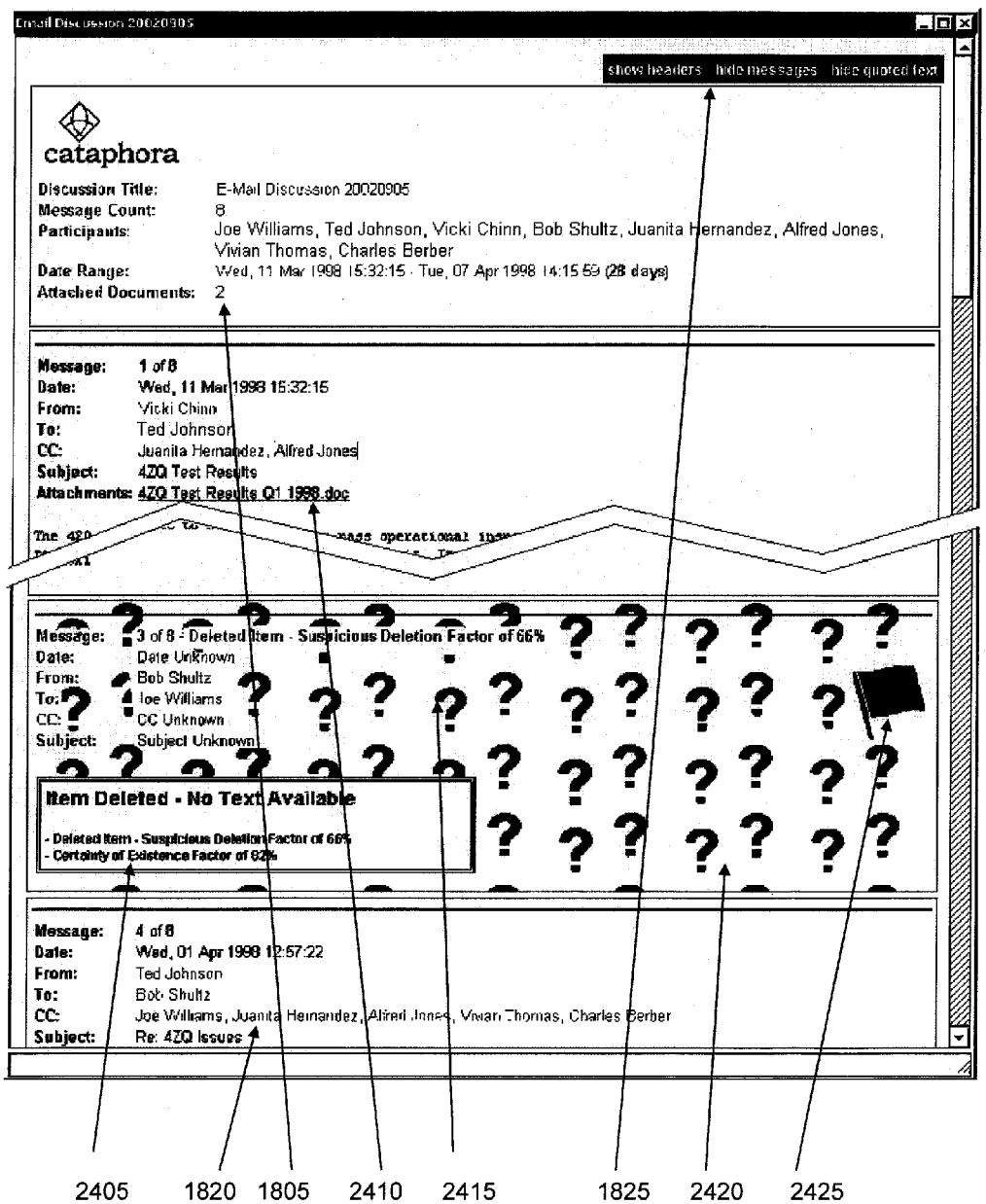
Figure 24: Transcript view showing deletion

Figure 25: Transcript view showing Instant Messages (IMs)
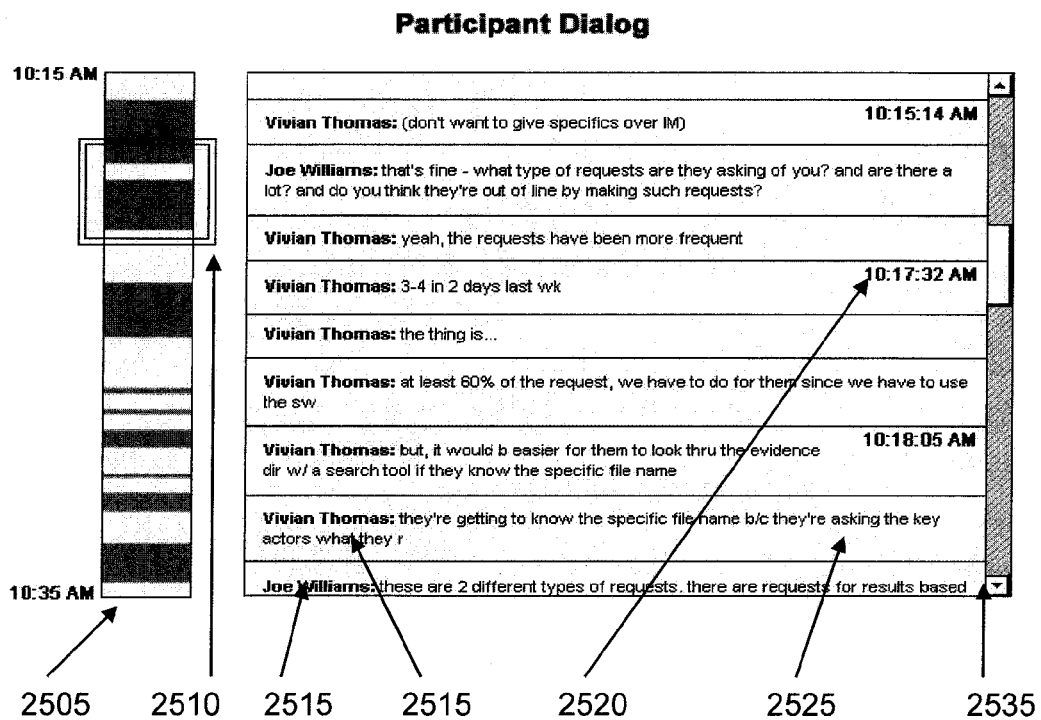

Figure 26: Query results view showing actor images
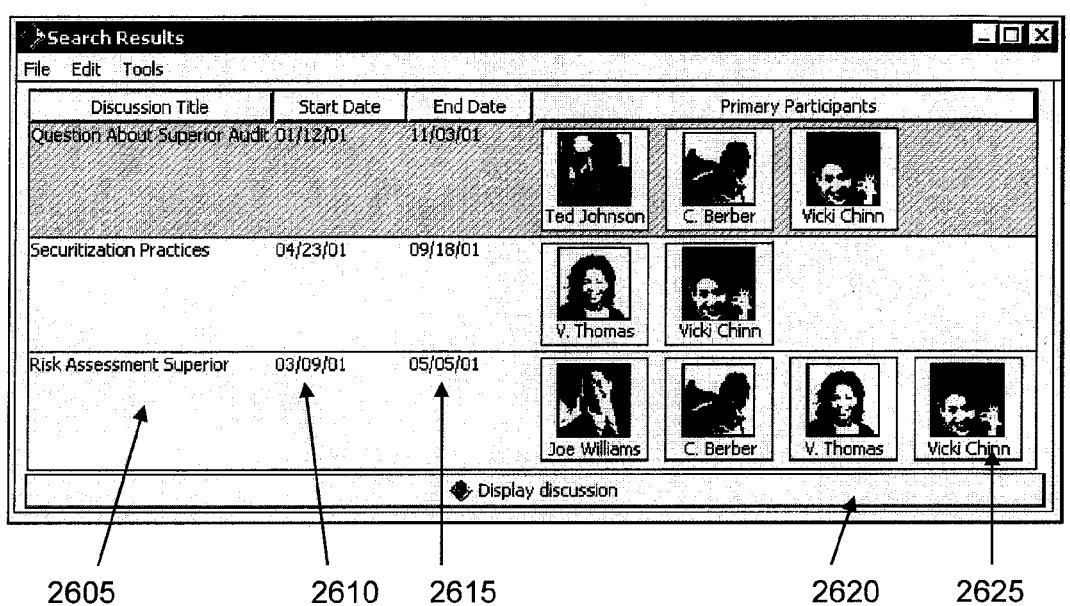

Figure 27: Matrix Query Results View

| | 2705 | 2705 | 2705 | 2705 | 2705 |
|---|---|---|---|---|---|
| Discussion Name | Joe Rodd | Ann Warren | Mia Keller | Sue Garson | Bo Li |
| Q4 Projections | ■ | | ■ | | |
| Setting Analyst Expectations | ■ | | ■ | ■ | ■ |
| Revenue Recognition Rules - Reminder | ■ | | | ■ | |
| Major Deal Review | ■ | ■ | | ■ | |

2710   2710   2710   2710   2715   2720

Figure 28: Saved queries
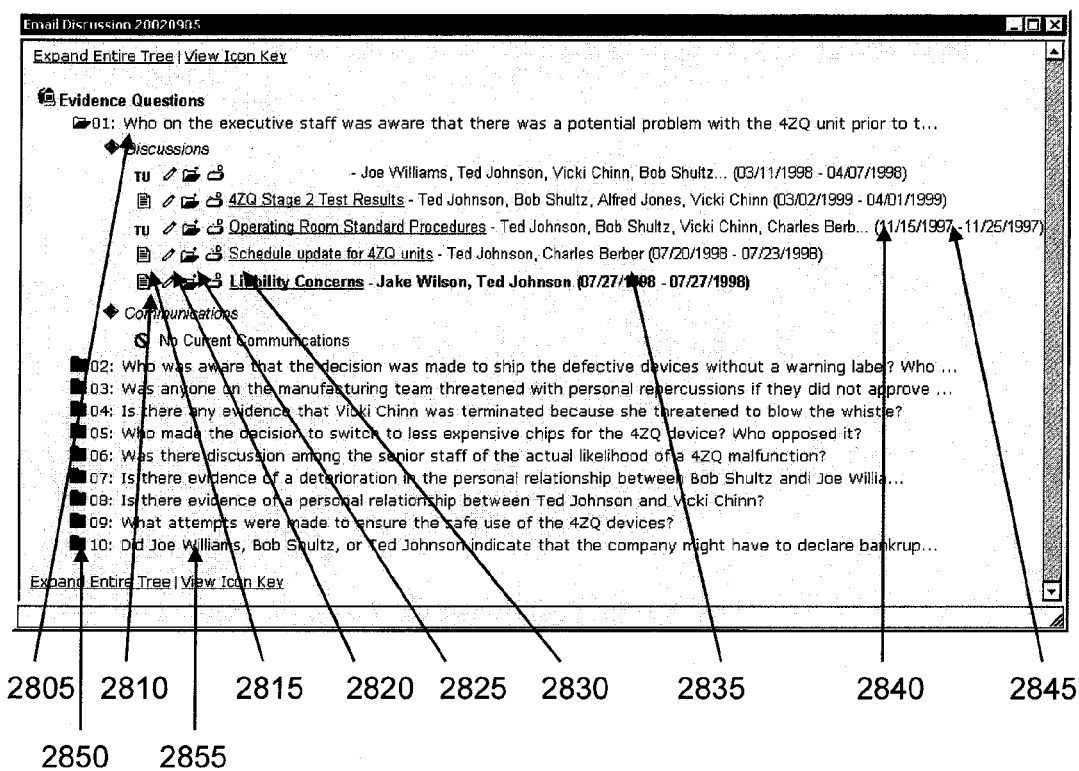

Figure 29: Querying tool
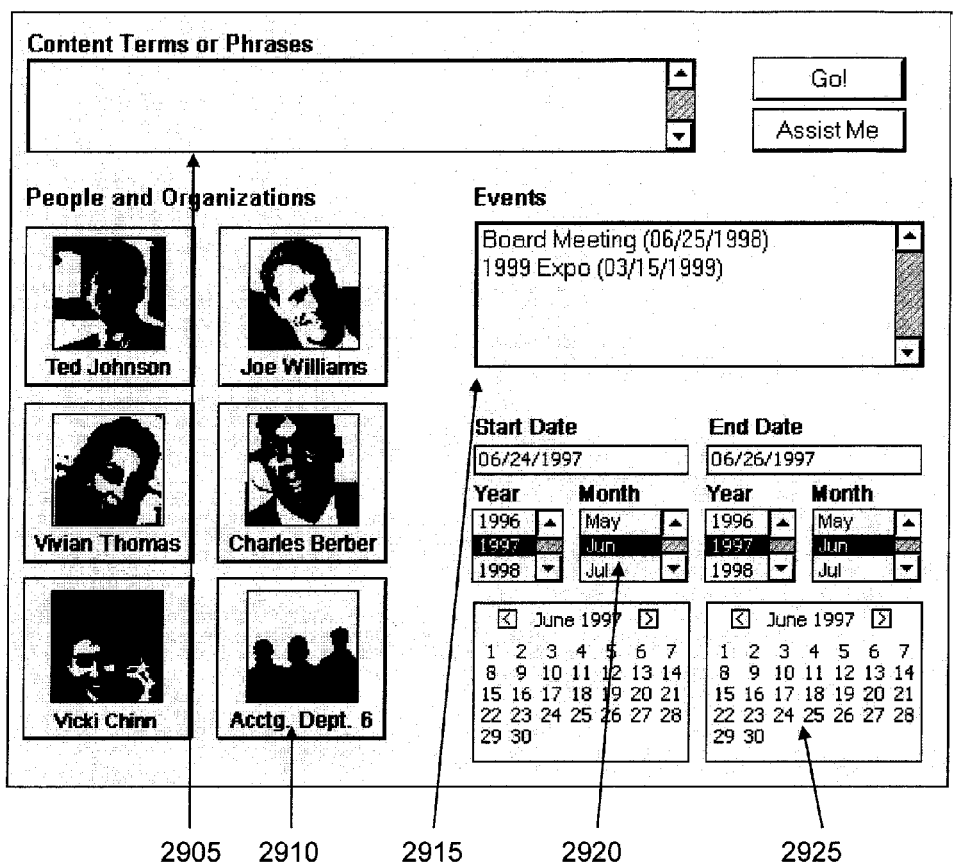

Figure 30: Querying tool specifying actor involvement and using saved queries
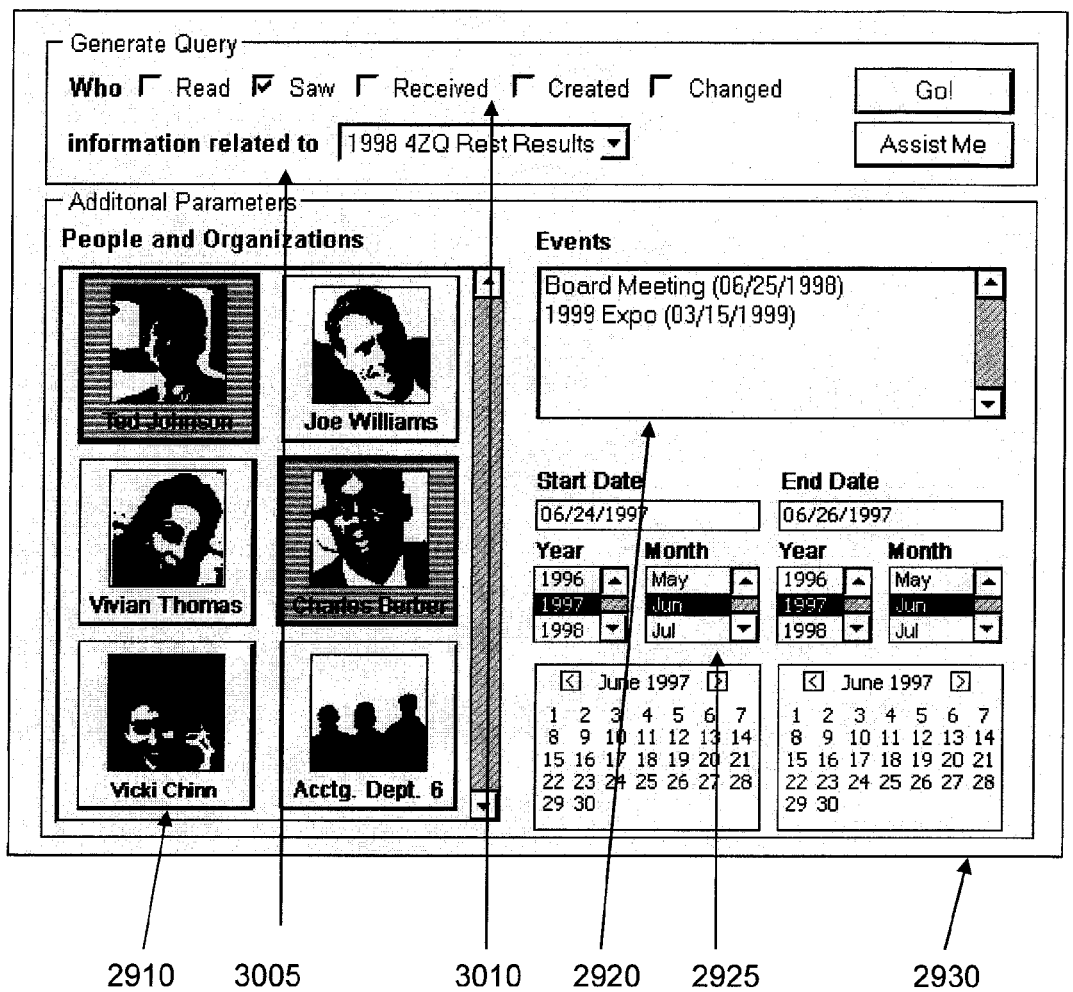

Figure 31: Querying tool specifying actors to exclude from the query
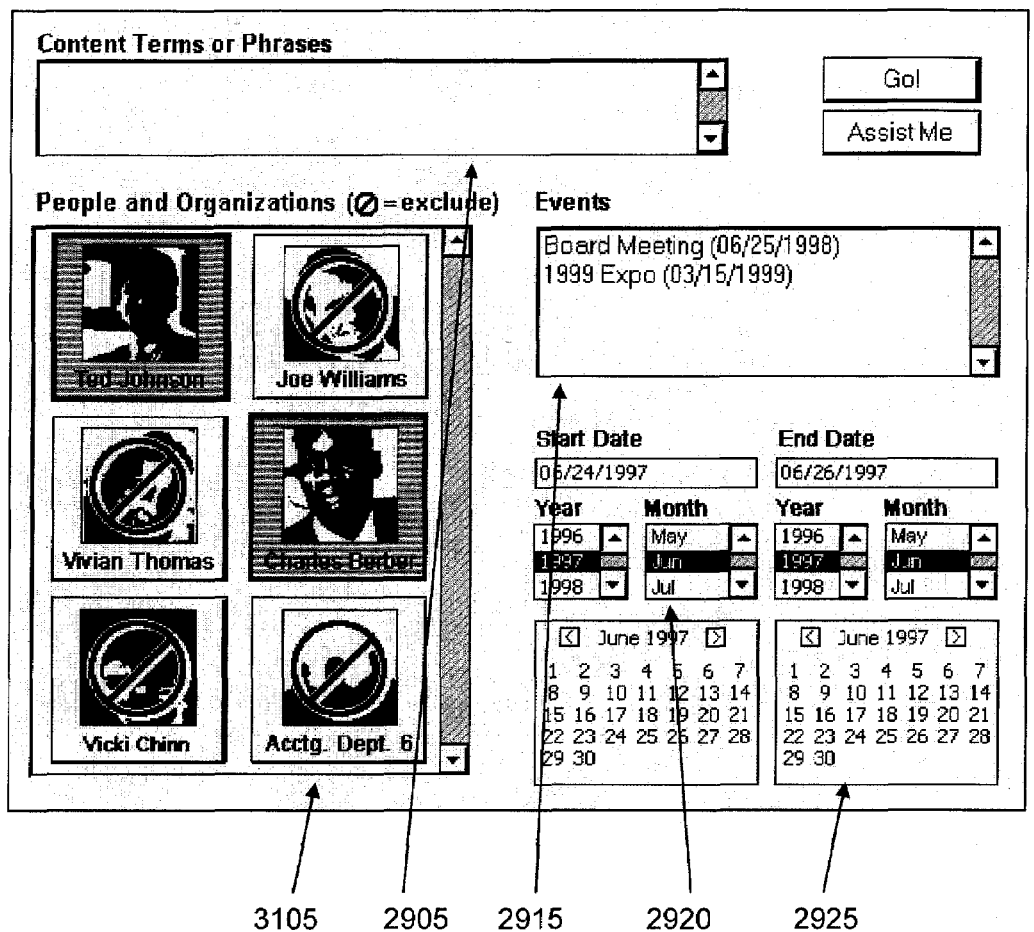

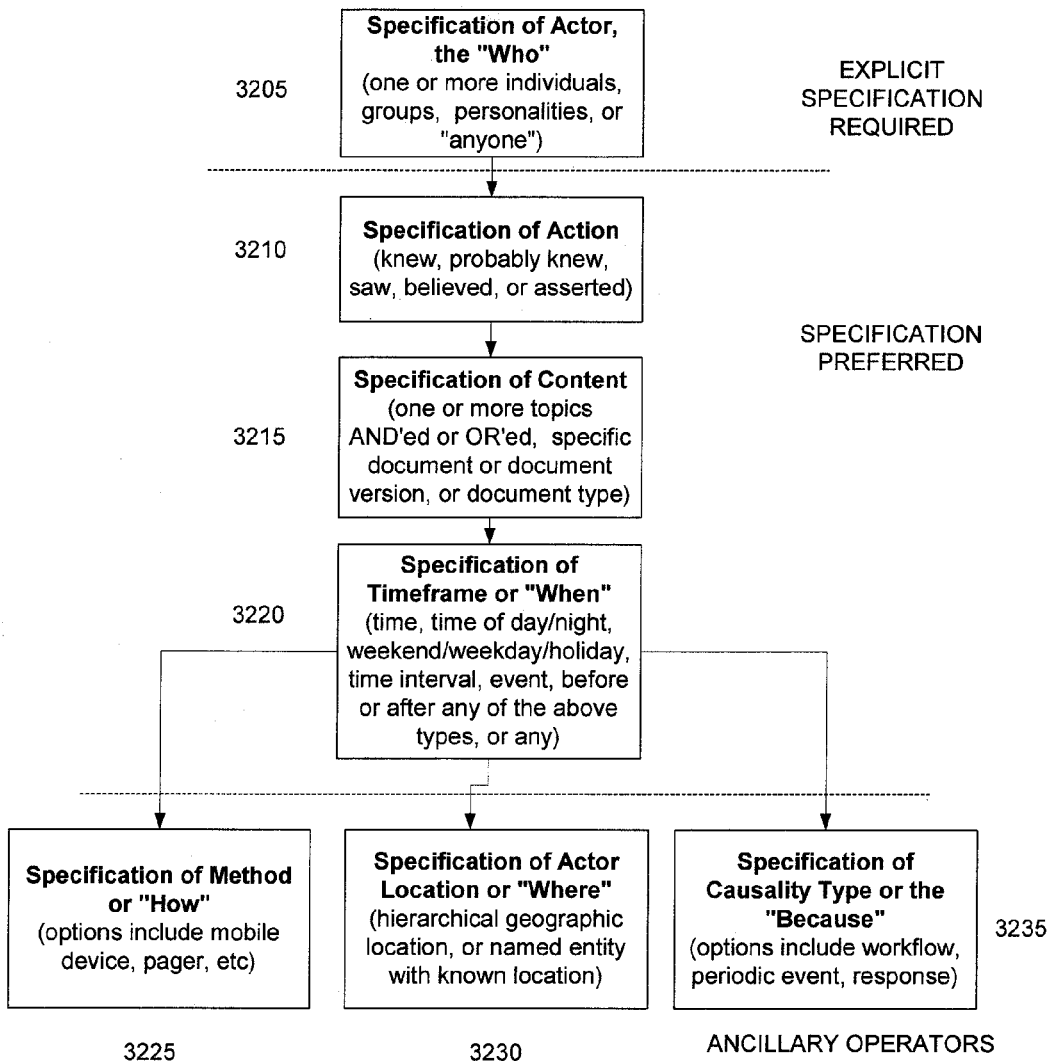
Figure 32: Query Template 1

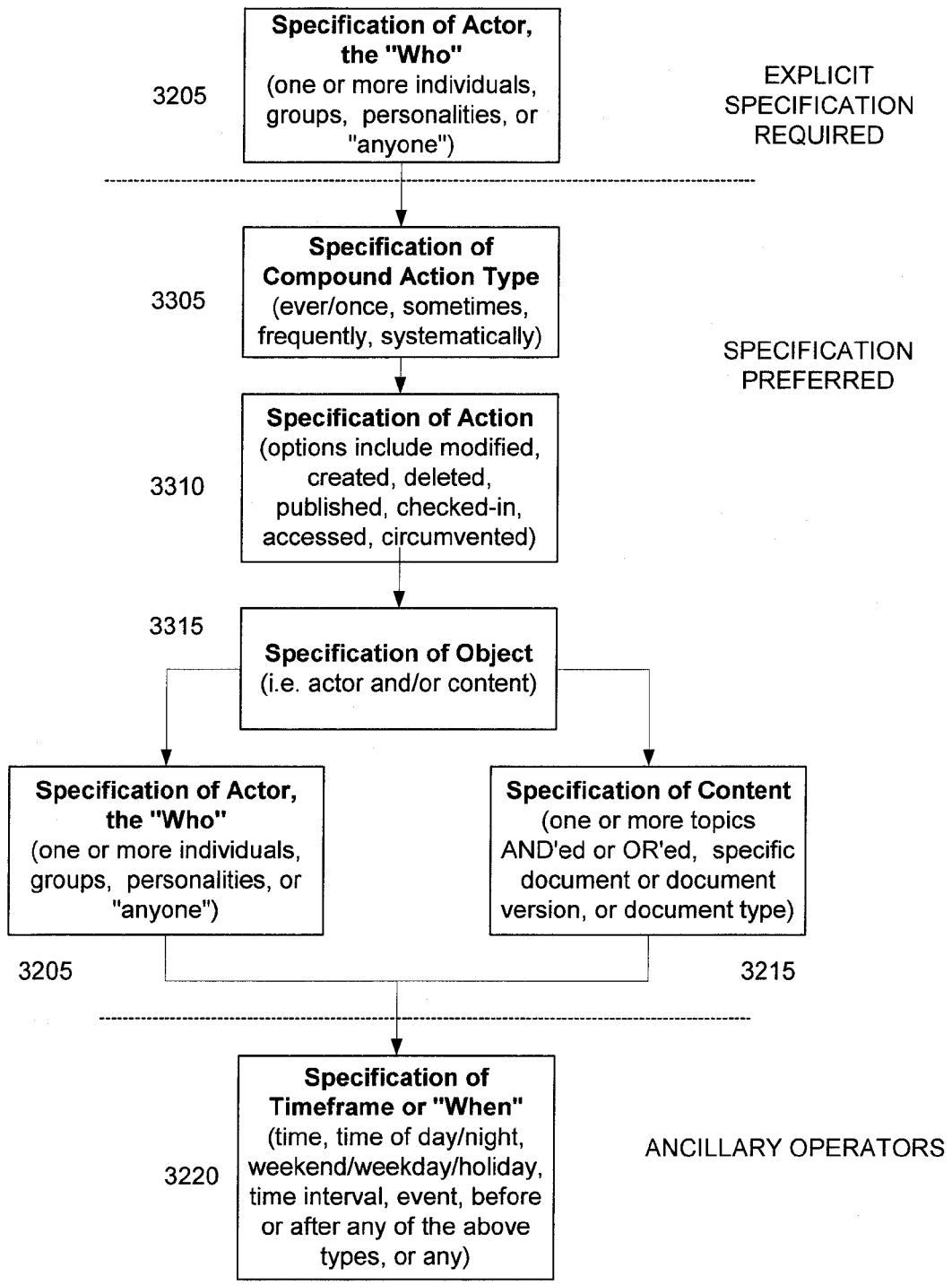
Figure 33: Query Template 2

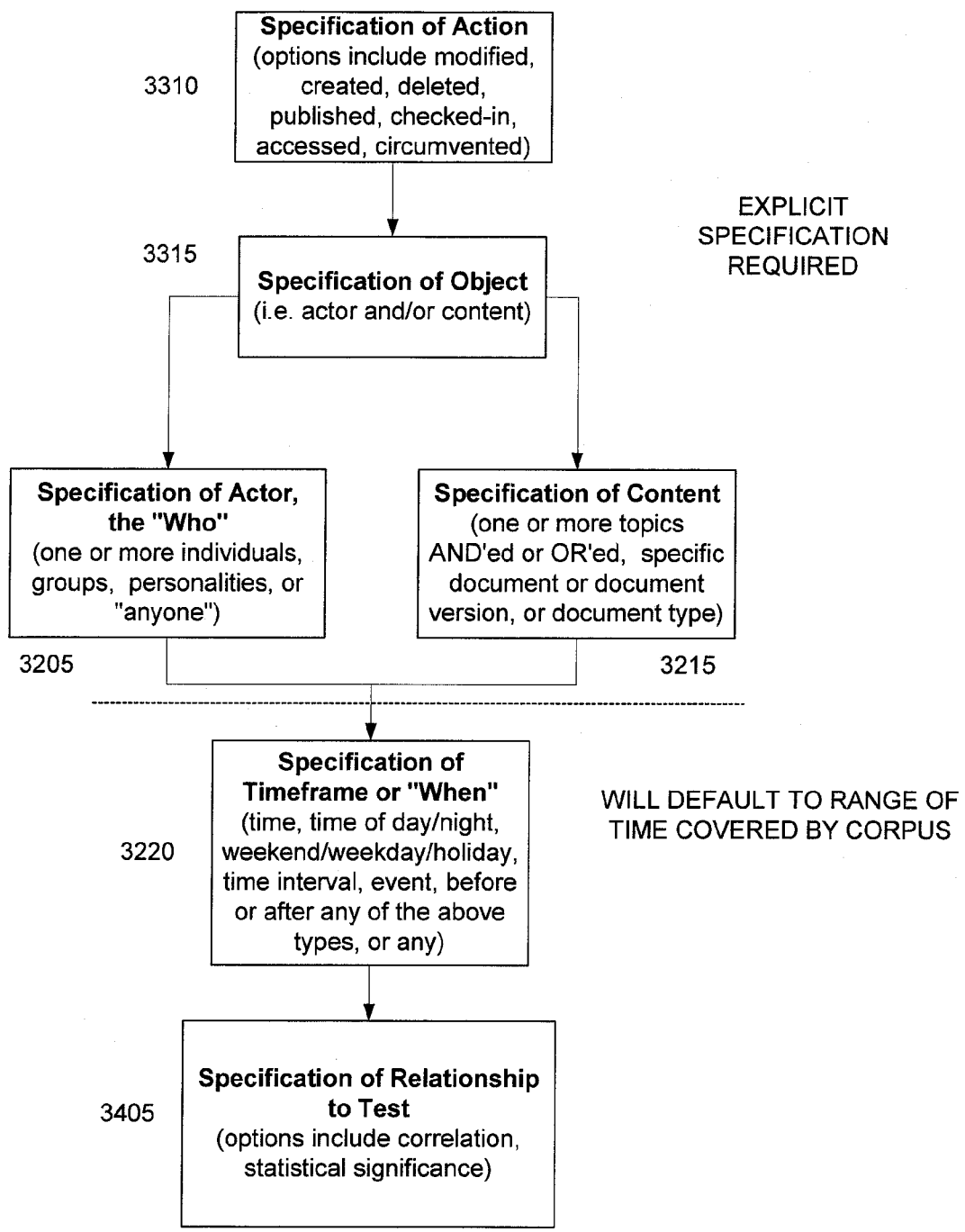
Figure 34: Query Templates 3 & 4

Figure 35: Query Components (document and operator types)
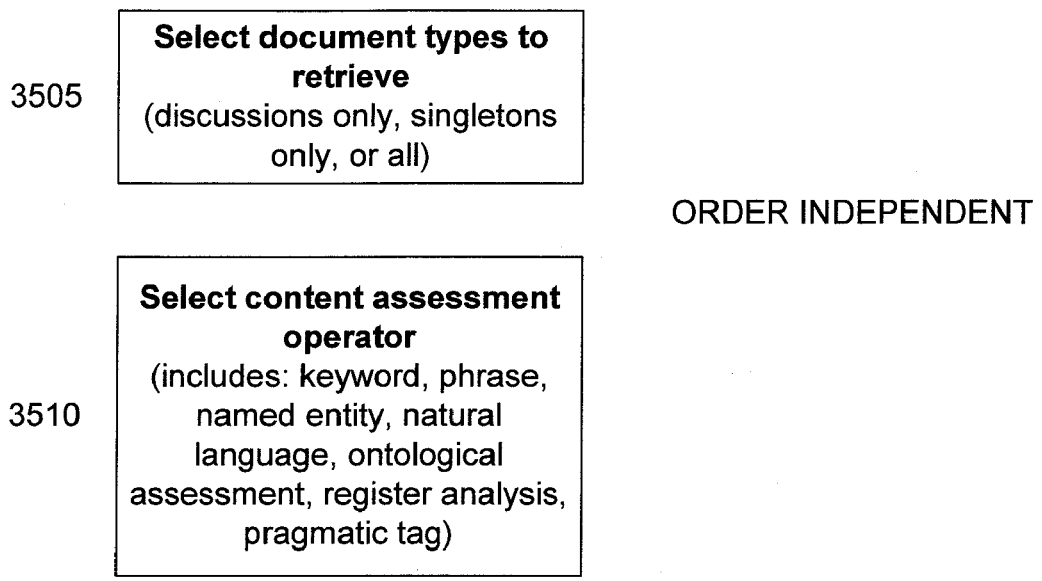

Figure 36: Venn diagram view of document categories
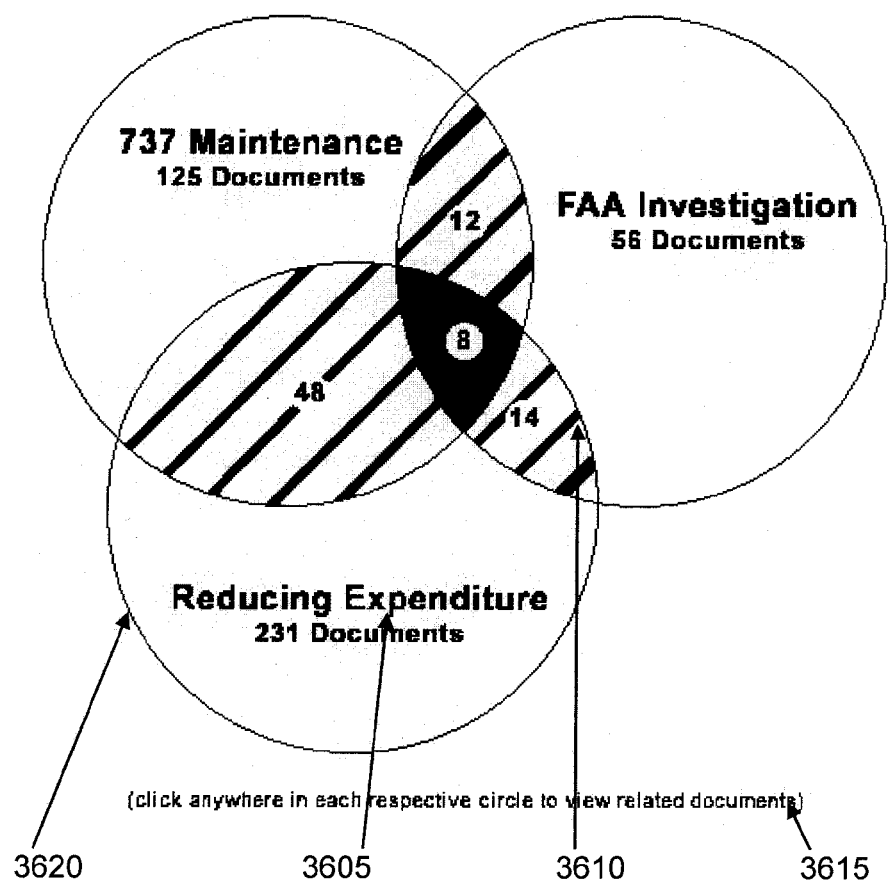

Figure 37a: Query by Example, Step 1

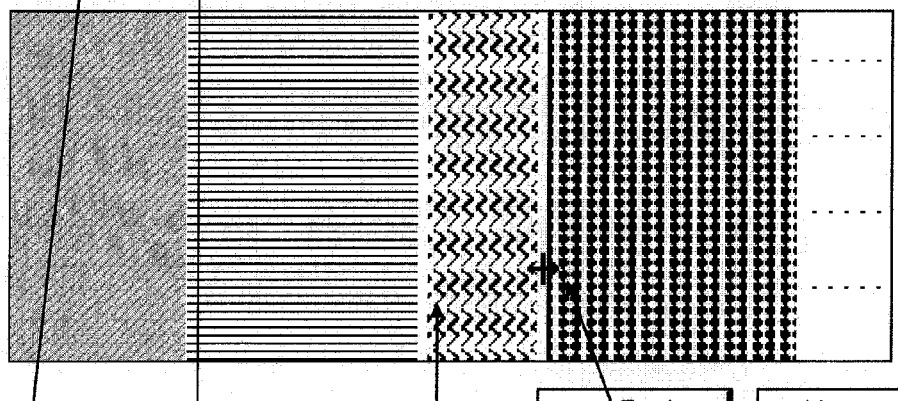
Figure 37b: Query by Example, Step 2

Figure 37c: Query by Example, Step 3

Results Warning

Based on the priorities provided, the result is broken down into 6 clusters.

Results

| Clus | Score | Subject | People | Date Range |
|---|---|---|---|---|
| ▨ | 75% | 4ZQ Test Results | Joe Williams | 03/11/1998 - 04/ |
| ▨ | 66% | Operating Room Standard Procedure | Ted Johnson | 11/15/1997 - 11/ |
| ▨ | 45% | Early Test Results | Ted Johnson | 05/02/1998 - 05/ |
| ▤ | 82% | Switching Chip Providers? | Ted Johnson | 01/18/1999 - 01/ |
| ▤ | 23% | Requalifying for Restricted Operation | Charles Berb | 12/04/2001 - 12/ |

▨ Content Terms  ▤ People & Organizations  ▨ Topics  ▨ Content Type  ▨ Ontology

[<< Back]  [Next >>]

3745    3750    3755

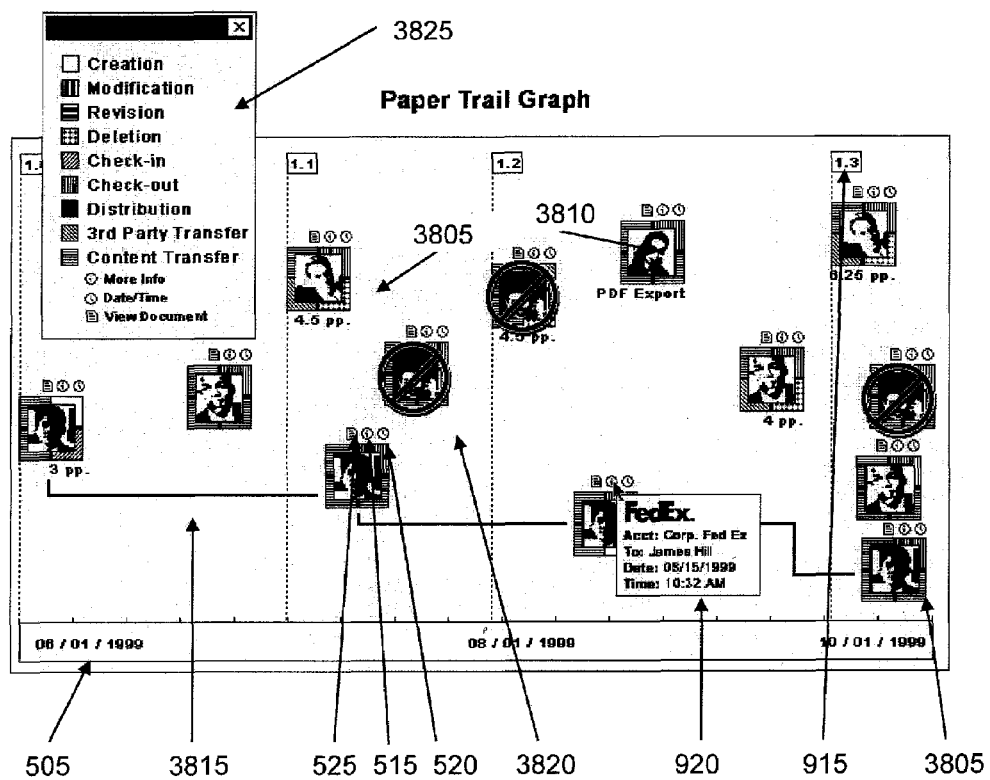
Figure 38: Document lifecycle view

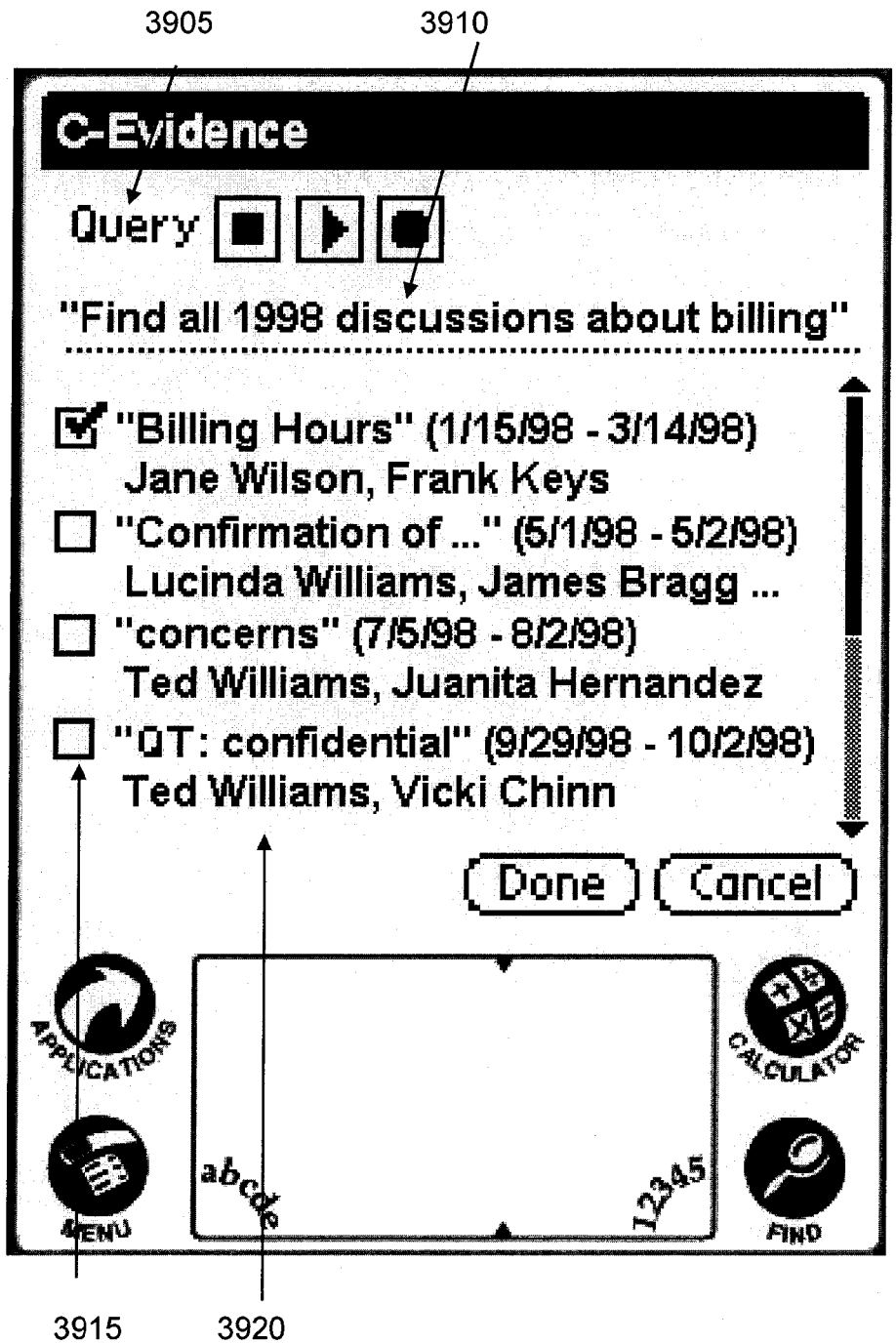
Figure 39: User interface for viewing discussions on a PalmOS-based mobile device Figure 40: Case management master window view
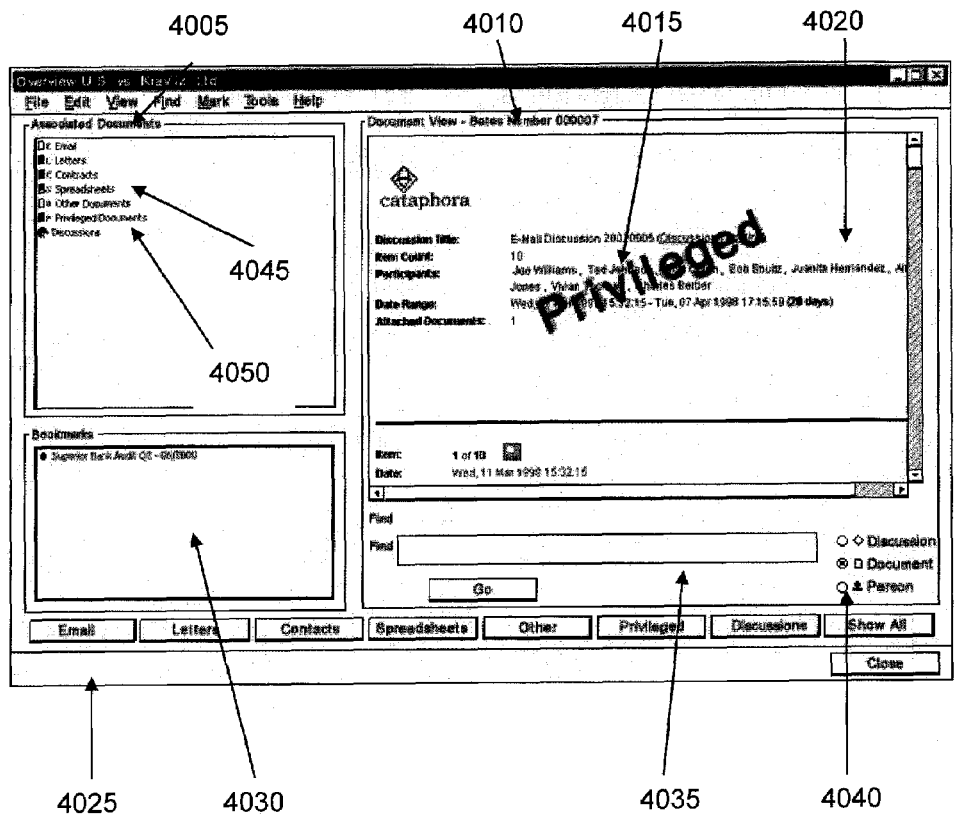

METHOD AND APPARATUS TO VISUALLY PRESENT DISCUSSIONS FOR DATA MINING PURPOSES

FIELD OF THE INVENTION

The present invention relates to electronic documents, and more particularly to a method for visualizing the relationships among, and retrieving one more groups of documents satisfying a user-defined criterion or set of criteria.

BACKGROUND

The volume of electronic information in both personal and corporate data stores is increasing rapidly. Examples of such stores include e-mail messages, word-processed and text documents, contact management tools, and calendars. But the precision and usability of knowledge management and search technology has not kept pace. The vast majority of searches performed today are still keyword searches or fielded searches. A keyword search involves entering a list of words, which are likely to be contained within the body of the document for which the user is searching. A fielded search involves locating documents using lexical strings that have been deliberately placed within the document (usually at the top) with the purpose of facilitating document retrieval.

These data retrieval techniques suffer from two fundamental flaws. Firstly, they often result in either vast numbers of documents being returned, or, if too many keywords or attribute-value pairs are specified and the user specifies that they must all appear in the document, no documents being returned. Secondly, these techniques are able only to retrieve documents that individually meet the search criteria. If two or more related (but distinct) documents meet the search criteria only when considered as a combined unit, these documents will not be retrieved. Examples of this would include the case where the earlier draft of a document contains a keyword, but where this keyword is absent from the later document; or an e-mail message and an entry in an electronic calendar, where the calendar entry might clarify the context of a reference in the e-mail message. There is a clear need for a search technique that returns sets of related documents that are not merely grouped by textual similarity, but also grouped and sequenced according to the social context in which they were created, modified, or quoted.

This would make it possible to retrieve a very precise set of documents from a large corpus of data. Hitherto, with conventional search tools, this has only been possible by the use of complex search queries, and the results have been restricted to documents that individually meet the search criteria. It is desirable to be able to retrieve a precise set of documents from a large corpus of texts using relatively simple search queries. It would be of further benefit to present said documents in the context of causally related links (for example, a document containing the minutes of a board meeting has a causal link to an email announcing that meeting), even when those other documents do not, individually, satisfy the search criteria. This would relieve the user of the need for prior knowledge (before running the search) of such details as the exact date on which a message was sent, and who sent it. Existing search tools require such prior knowledge, because they do not establish causal links between documents.

SUMMARY

A method of organizing information is disclosed. The method comprises providing a visualization of actor communications in the context of one or more discussion, a discussion including at least one actor and at least one documented communication.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram of one embodiment of a network, which may be used with the present invention.

FIG. 2 is a block diagram of one embodiment of a computer system.

FIG. 3 is a block diagram of navigation flow in one embodiment of the present invention.

FIG. 4 is a block diagram of user-interface flow in one embodiment of the present invention.

FIG. 5 is a screen shot of one embodiment of the participant graph.

FIG. 6 is a screen shot of another embodiment of the participant graph, in which the time of day is represented.

FIG. 7 is a screen shot of a form panel for adding items that were not originally part of the discussion being visualized.

FIG. 8 is a screen shot of one embodiment of a participant graph, in which a pop-up showing basic information about the item is displayed.

FIG. 9 is a screen shot of one embodiment of a document trail graph

FIG. 10 is a screen shot of one embodiment of a money trail graph

FIG. 11 is a screen shot of one embodiment a view that uses a color, pattern, or similar distinguishing mechanism which uses the color spectrum to help users to discern small shifts in the communication activity of a very large population of actors.

FIG. 12 is a screen shot of one embodiment of an activity graph, which illustrates the amount of communication among actors over a user-specified period of time.

FIG. 13 is a screen shot of one embodiment of a discussion timeline, in which each discussion appears as a rectangle of the length appropriate relative to its duration in the timeline.

FIG. 14 is a screen shot of one embodiment of a discussion timeline, with a spider-eye panning widget to temporarily change the resolution of the discussion visualization.

FIG. 15 is a screen shot of one embodiment of a discussion timeline, showing the individual events in the discussion.

FIG. 17 is a screen shot of one embodiment of a graphical representation of a discussion timeline.

FIG. 16 is a screen shot of one embodiment of a discussion cluster view.

FIG. 18 is a screen shot of one embodiment of a transcript view, showing actor color-coding.

FIG. 19 is a screen shot of one embodiment of a transcript view, showing actor activity.

FIG. 20 is a screen shot of one embodiment of a transcript view, showing discussion partitions.

FIG. 21 is a screen shot of one embodiment of a transcript view, showing actor and document-type color-coding.

FIG. 22 is a screen shot of one embodiment of a transcript view, showing document attachments.

FIG. 23 is a screen shot of one embodiment of a transcript view, showing color-coding of quoted text.

FIG. 24 is a screen shot of one embodiment of a transcript view, showing that a deletion has occurred.

FIG. 25 is a screen shot of one embodiment of a transcript view, showing Instant Messages (IMs).

FIG. 26 is a screen shot of one embodiment of a query results view, showing discussion titles, discussion start and end dates, and actor images.

FIG. 27 is a screen shot of one embodiment of a matrix query results view.

FIG. 28 is a screen shot of one embodiment of the saved queries view.

FIG. 29 is a screen shot of one embodiment of a tool for submitting user queries.

FIG. 30 is a screen shot of one embodiment of a tool for submitting user queries, in which said tool allows the user to select types of actor involvement, and to use a saved query.

FIG. 31 is a screen shot of one embodiment of a tool for submitting user queries, in which said tool allows the user to exclude certain actors from the query.

FIG. 32 is a diagram of a query template (Template 1).

FIG. 33 is a diagram of a query template (Template 2).

FIG. 34 is a diagram of query templates (Templates 3 & 4).

FIG. 35 is a diagram of query components.

FIG. 36 is a screen shot of one embodiment of a Venn diagram view of document categories.

FIGS. 37a-37c are screen shots of one embodiment of Query by Example (QBE).

FIG. 38 is a screen shot of one embodiment of the document lifecycle view.

FIG. 39 is a screen shot of one embodiment of a user interface for viewing discussions on a PalmOS-based mobile device.

FIG. 40 is a screen shot of one embodiment of the master window view of the case management user interface.

DETAILED DESCRIPTION OF THE INVENTION

A method and apparatus for visualizing both the electronic paper trails referred to as "discussions" and the statistical anomalies and patterns that are directly computable from these discussions is disclosed. A discussion in this context is a heterogeneous set of causally related communications and events for which either electronic evidence exists, or can be created to reflect. Thus, a discussion provides a means of reviewing a series of related events that occurred over time. One example of generating such discussions from raw communications data is discussed in more detail in application Ser. No. 10/358,759 now U.S. Pat. No. 7,143,091, entitled "A Method and Apparatus for Retrieving Interrelated Sets of Documents", filed concurrently herewith (hereinafter referred to as 'An Apparatus for Sociological Data Mining'). The visualizations and user interface tools described in this application greatly facilitate the efficient and effective review and understanding of such chains of events.

The views described in the following sections provide both graphic visualizations, as well as a means of navigating through the complex chains of communications and events that comprise the data being visualized. These views may be offered to the user in a Model View Controller (MVC) graphical user interface, or via a web-based application.

The present invention will typically be used in conjunction with a computer network. FIG. 1 depicts a typical networked environment in which the present invention operates. The network 105 allows access to email data stores on an email server 120, log files stored on a voicemail server 125, documents stored on a data server 130, and data stored in databases 140 and 145. Data is processed by an indexing system 135 and sociological engine 150, and is presented to the user by a visualization mechanism 140. The visualization mechanism 140 is described in more detail in the present application.

The present invention is for use with digital computers. FIG. 2 depicts a typical digital computer 200 on which the present system will run. A data bus 205 allows communication between a central processing unit 210, random access volatile memory 215, a data storage device 220, and a network interface card 225. Input from the user is permitted through an alphanumeric input device 235 and cursor control system 240, and data is made visible to the user via a display 230. Communication between the computer and other networked devices is made possible via a communications device 245.

It will be appreciated by those of ordinary skill in the art that any configuration of the system may be used for various purposes according to the particular implementation. The control logic or software implementing the present invention can be stored in main memory 250, mass storage device 225, or other storage medium locally or remotely accessible to processor 210.

It will be apparent to those of ordinary skill in the art that the system, method, and process described herein can be implemented as software stored in main memory 250 or read only memory 220 and executed by processor 210. This control logic or software may also be resident on an article of manufacture comprising a computer readable medium having computer readable program code embodied therein and being readable by the mass storage device 225 and for causing the processor 210 to operate in accordance with the methods and teachings herein.

The present invention may also be embodied in a handheld or portable device containing a subset of the computer hardware components described above. For example, the handheld device may be configured to contain only the bus 215, the processor 210, and memory 250 and/or 225. The present invention may also be embodied in a special purpose appliance including a subset of the computer hardware components described above. For example, the appliance may include a processor 210, a data storage device 225, a bus 215, and memory 250, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 210. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

Navigation among views is facilitated by the fact that all of the viewable entities have very close relationships to one another, as depicted in FIG. 3. The user can submit queries 320, which return discussions 305. Each discussion must contain at least two actors 310. Each of the actors 310 about whom the user can submit queries 320 must appear in zero (0) or more discussions 305 (an actor can appear in 0 discussions by being connected in some way with a singleton document which, by definition, is not part of a discussion). An actor 310 can be associated with multiple topics 315, and vice versa. Each discussion 305 can be associated with multiple topics 315, and vice versa.

Hence, for example, in a view depicting discussions, the user can generally click on an image representing an actor to see additional information about this actor, and vice versa.

More generally the usage of the user interface flows as shown in FIG. 4. A user submits a query 320 using either Query by Example 405, Multi-evidence Query User Interface 410; Query Language 415; Canned Query Templates 420, Visual Query Interface 425, or Query Building Wizard 430. The resulting query specifies at least one of a number of parameters, including but not limited to actors, time, topic, related events, communication type, specific documents and work-flow processes. Additionally, the system allows the user to submit queries in natural language format.

The results may comprise singleton documents 425, discussions 305, actors 310, statistics 440 and topics 315. Results are displayed in one or more of the formats appropriate to the results content and shown in FIG. 4. Thus, singleton documents are displayed in tabular list view. Discussions are displayed as a participant graph, overview graph, transcript view, question and answer list, matrix view, cluster view, or tabular list view. Actors are displayed in an activity graph, participant graph, actor profile, matrix view, tabular list view or cluster view. Statistics are displayed as an activity graph as a profile view (for example, actor profile view or data set profile view), or as a Venn diagram. Topics are displayed as an activity graph, Venn diagram, overview graph, matrix view or tabular list view. These views are discussed in more detail below with respect to other Figures.

Views:
Participant Graphs: graphs that connect the actions of a certain set of participants as related to one or more discussions
Activity Graphs: comparative or individual graphs that indicate the historical communication or collaboration activity over time among various actors.
Overview Graphs: diagrams that contain data on one or more discussions, documents, topic discussion, or other aggregate behavior.
Document Trail Graphs: diagrams that display data tracing the lifecycle of a document or group of documents, including but not limited to such events as document revisions, check-ins and transmissions.
Money Trail Graphs: diagrams that chart the flow of money, based on information gleaned from a discussion.
Transcript View Variations: any primarily text-oriented view that lays out a sequence of events and/or communications
Object Lifecycle Views: views that are focused on the electronic data objects, rather than on the actors.
Animation: description of different ways that interactive or animated aids or trial art could be generated from any of the above.
Related Materials include:
Querying Tools: any view that can serve the purpose of generating a query, including some of the above
Case Management Application
Query Language
Mobile, Voice & Related Applications Participant Graphs
Participant graphs shown in FIGS. 5-8 represent the set of communication items which belong to a particular discussion, or in some embodiments, multiple discussions.

FIG. 5 is a screen shot showing one embodiment of the participant graph for a fragment of a discussion, showing the actors involved and the various communications that took place between the actors during the discussion fragment. Each actor is denoted by a unique icon 545, which in this example is a photograph or some other graphical representation of the actor. In other embodiments, a textual representation of the actor (far example, the actor's name) could be used. Communications are denoted by connections 540 between actors. In this example, three communication types are shown: documents, email and instant messages, each of which is denoted by a unique color code, pattern, icon, or other distinguishing mechanism. A legend 550 at the top-right of the screen shot indicates the meaning of each color, and of each of four icons that are used to label the connections. These icons, when clicked on, allow the user to view communication content, view the communication type, receive more information about the communication (for example, the exact time at which it was created), and obtain help. A timeline 505 allows the user to see the date and time at which each transaction in the discussion took place. By interacting with a content icon 510, the user can see the content of any document and the time when the transaction took place. A type icon 515 allows the user to see information about the transaction type and/or document type. A 'more info' icon 520 allows the user to see basic information about the transaction. A clock icon 525 allows the user to see the precise time at which the transaction took place. The system may further display a popup 530, which shows a chronological list of the transactions in which the current actor participated within the current discussion. For one embodiment, the popup 530 is displayed when the user clicks on an actor's icon 545. In one embodiment, the personality (or personalities) of a given actor that participated in a discussion can be displayed.

FIG. 6 shows a screen shot of a participant graph similar to that shown in FIG. 5. Additionally, it uses background color 610 and a series of time-of-day icons 615 at the top of the screenshot to denote the time of day at which the communication was created. In FIG. 6, the user has positioned the mouse cursor close to the 'more info' icon 520, thereby causing a popup window 605 to be displayed containing basic information about the transaction. In one implementation, a panning widget 630 allows the user to navigate forwards and backwards within the discussion using the time-of day bar 620. In one implementation, a drop-down list box 625 allows the user to switch between different time zones, thereby adjusting the alignment of the discussion with the time-of-day icons 615.

FIG. 8 shows a screen shot of a participant graph similar to those shown in FIGS. 5 and 6. Additionally, it shows a toolbar 810 at the top of the screen that allows the user to select between different discussion views: activity, participant (shown here), and transcript. A second toolbar 815 provides buttons to allow the user to carry out the following actions: to zoom in on a particular part of the discussion, thereby showing the elements of said discussion in greater detail; to pan between different sections of the discussion; to filter the discussion on criteria that may include (but are not limited to): actor, communication type and time; to adjust the view of the discussion based on time span; to print the discussion or the contents of the graphical view; or to define new events to add to the view. In this screen shot, the user has hovered the mouse over the link 540 between two actors, thereby causing a popup 605 to be displayed. The popup 605 contains further details about the communication over whose link the user is hovering the mouse. A user interface navigation mechanism 830 at the bottom of the page allows the user to control which section of the discussion is displayed on screen. A pair of drop-down list boxes 825 allows the user to control the discussion display through the use of filters. An icon 820 and vertical dotted line 835 indicate the occurrence of a significant event (in this example, a board meeting) during the period displayed.

Participant graphs show the images 545 of the actors participating in a discussion, and the links 540 between the transactions in which they participated. Participant graphs may display a timeline 505 to show when user activity occurred, and may also display a background 610 in varying shades in order to represent daytime and nighttime activity. Participant graphs can optionally be limited to a partition of a discussion, or to only include certain specific actors of interest, either individually or by some property such as organization. It may also be limited to displaying only those actors who played an active rather than passive role in the items in question, where "active" is defined as initiating one or more of the items. In one embodiment of the invention, the user may set a threshold value for how active the actor had to have been in the discussion in order to be displayed, based on measures including, but not limited to, the number of items in the discussion initiated by that actor, the importance of these items; whether any were "pivotal" as described in 'An Apparatus for Sociological Data Mining'. For one embodiment, if an actor has been filtered out, but was responsible for initiating a transaction, a small icon containing " . . . " is displayed in lieu of the regular actor icon. Clicking on this icon expands that instance to the form of the regular icon for that actor. Alternatively, the actor may be identified in other ways including, but not limited to, a smaller icon, or a browned out icon.

In this view, each items is depicted as a line connecting two or more actors. The color of the line indicates the type of item. Choices include, but are not limited to:

Email

Instant Message

Sending a document (as an attachment in email)

Phone call (one version with transcript, one without)

Voicemail (presuming that it had been processed by a speech to text indexer)

Wire or other funds transfer

Fax

Sending/Receipt of FedEx or other electronically trackable package

Actors 545 may be individuals, or they may be aggregate actors. Examples include an organization, the executive team, or de facto actor group such as a "circle of trust" as defined in 'An Apparatus for Sociological Data Mining'. A group mail alias would also be considered an aggregate actor. In some cases, an actor might be a system or automated process, for example, a daemon that sends out a particular status message. Actors may be represented by actual photographs 3810 of themselves when available. Alternately, the user may choose a graphic representation for each actor by choosing from a canned library of images, or adding any electronic image that they wish. Once selected, the same image is used to represent this actor visually throughout the entire system.

If an actor has more than one distinct personality (as defined in 'An Apparatus for Sociological Data Mining' patent), in some embodiments of the invention, the user has the option to use a different image or graphic for each such personality. If the user opts not to do this, where multiple personalities exist the system will use the one graphic provided to represent all personalities, but will tint the image with different colors in order to allow the various distinct personalities to be readily identified. The user may globally specify the color scheme to be used in such cases; for example, the primary personality will always be tinted blue.

The graph is represented as a timeline of events; the resolution can be increased or decreased using zoom in and out controls. In one embodiment, daytime and nighttime hours are indicated by a change in background color; as shown in FIG. 6. In some embodiments, icon markers 615 indicating time of day may also be used; as shown in FIG. 6. Icons may optionally be displayed that indicate the document type of the transaction in those cases where it is appropriate, for example, to indicate that the document being sent was an Excel spreadsheet rather than a Microsoft Word document. In the event that there are multiple documents attached, each appropriate document type icon is displayed. In another embodiment, a multiple document type icon is displayed, which depicts a stack of overlapping rectangles. In one embodiment, the system provides a different visualization for documents which were attached as opposed to incorporated by reference with a URL or something similar. Rolling the mouse over or near any of the transaction lines will bring up a pop-up 605 with basic information about the transaction (FIG. 6). The exact types of information vary by transaction type, but include, as appropriate, the following:

Originating timestamp and timezone

Originating geographic location

Wire transfer amount

Length of phone call or voicemail message

Subject or title

Sensitivity level

Urgency or priority

Ending timestamp and timezone

Return of read receipt timestamp

Alternately, the user may click on the small icon to get only the timestamp details. In one embodiment, right-clicking on this icon provides an immediate chronology of events just before and after the item in question with timestamp information. This is to help clarify which event preceded which, in those cases where the events were almost contemporaneous. The "content" icon can be used to pull up the content of the document involved in the transaction. In one embodiment, there is also optionally a "More info" icon that can be configured to display other types of data that are appropriate. Examples of such data include, but are not limited to: prior user annotations about the transaction, its retrieval history, or the relation of that transaction to a known workflow pattern.

In one embodiment, actors are shown partially grayed out if their presence in the transaction was likely, but could not be verified solely on the basis of the electronic evidence. One example of this is the case of a meeting entry pulled from an online group calendar which asserts that Joe, Jack, and John will be present at the meeting. Without other supporting evidence, such as meeting minutes indicating that all parties were present, it cannot be definitively asserted that all three men attended the meeting.

Mousing over an actor icon will bring up a pop-up with the basic information available on that actor. This includes, but is not limited to, the following:

Full name

Title

Organization

Primary electronic identity

Electronic identity conducting the transactions whose lines connect to this icon (if different than the primary)

Clicking on an actor icon brings up a panel with a chronological list 530 (shown in FIG. 5) of the transactions this actor participated in within the discussion(s) being visualized.

In one embodiment, the user interface allows the user to add items that were not originally part of the discussion being visualized. This is done through filling out a form panel, shown in FIG. 7, in the user interface, specifying all of the information that would have been associated with an actual item.

FIG. 7 is a screen shot of a form panel for adding items that were not originally part of the discussion being visualized. The panel displays the discussion title 705, start date 710 and end date 715, and actors 720 involved. A text box 725 allows the user to enter a label for the item to be added. In one embodiment, this text box 725 is replaced with a dropdown listbox, combo box, or other user interface tool for adding an item from a preconfigured or dynamically generated list. A series of option buttons 730 allow the user to specify the type of item to be added. After an item is added, it would be shown on the participant graph. For one embodiment, items added by a user are flagged in the participant graph, to indicate their nature. For another embodiment, the information that an item has been added can be obtained using the 'info' icon 520.

In one embodiment, the view is implemented as a canvas, so the user may drag and drop shapes, lines, and text on it as they please. In one embodiment, such additions are checked for semantic correctness. For one embodiment, added events are indicated by color, patterns, icon, or some other indicator.

Events of interest are depicted as icons above or below the canvas from which vertical lines extend, cutting across the canvas at the appropriate point in the X axis. These events fall into one or more of the following categories:

An event belonging to the discussion, but which is not directly a transaction among its actors. For example, a milestone in a workflow process.

An event extracted from one of the online calendars of the primary actors in the discussion.

An event entered manually in the UI by the user

A canned library of icons to represent common concepts like "meeting" may be provided in the UI; the user may elect to add and use their own images as well. The user may also add descriptive text about the event. This text would appear when the user clicks on the icon representing that event.

In one embodiment of the invention, numerous animation utilities are provided in order to make the visualizations more vivid. Animation can help accentuate the involvement of certain actors of special interest; it can also highlight the accelerating or decelerating pace of the transactions. Types of animation provided in one embodiment of the invention are as follows:

Rendering the transaction lines and actor icons individually, in the order and timing in which they occurred, according to a condensed timeline appropriate for viewing in generally less than one minute. This emphasizes the lag time (or lack thereof) between contiguous transactions.

Similarly, but partially graying out, via compositing or other techniques, all transaction lines rather than not rendering them until their appropriate place in the timeline.

The layout algorithm for the view can be implemented with a number of commonly available graphing libraries. In one embodiment of the invention, a limit of 8 line connections per actor icon is imposed for readability purposes. For one embodiment, should additional connections be necessary in order to represent the underlying data, a second actor icon will be drawn to accommodate the additional lines. Note that while the graph generally follows a left to right timeline, a reply to an email message or IM will show a line going backwards to indicate that the transaction is a reply to a previous transaction, and that these two transactions should be considered part of a single nested transaction.

However, from an adherence to the timeline perspective, the placement of the two (or more) actor icons involved will be approximately at the start and end time of the nested transaction. If needed, additional actor icons will be rendered to ensure it. Since the purpose of the visualization is to provide an overview of the related transactions in a discussion, exact centering of the actor icons around the relevant line in the X axis is not considered essential. Exact event chronology information can be had from the ancillary panels that are only a single click away. In one embodiment of the invention, transaction lines are represented with directional arrows. In one of these embodiments, a "reply to" can be indicated with a line that has arrows on both ends; if there were N replies, the number N would be rendered near the appropriate arrow.

Finally, in one embodiment of the invention, the participant graph view can be used modally as a visual querying interface. The user may select a transaction by selecting its objects with a marquis tool, and generate a Query by Example (QBE) query. One example of QBE queries that may be used with this system is defined in 'An Apparatus for Sociological Data Mining'. The user may also select individual actor icons in order to see all transactions involving all of these actors.

Other accompanying UI widgets and tools include, but are not limited to, the following. A panning widget 620, shown in FIG. 6. This widget 620 utilizes a thumbnail image of the full discussion transcript view, shrunk to whatever length necessary to fit in the visible view. The participant graph automatically scrolls to the position indicated by the panning widget 620, making it especially useful for viewing discussions of long duration. Daytime and night-time hours are indicated in the thumbnail, allowing the user to easily detect, for example, anomalously high amounts of communications after standard or usual working hours. In one embodiment, nighttime starts at 5:00 PM in the primary time zone, or some other preconfigured time, and any communications or events after that time are distinguished, for example by being colored darkish gray. In another embodiment, a gradient fill is used to indicate rough time of day, as shown in FIG. 6. In one embodiment, communication and events occurring during weekends or holidays are coded, for example by being colored pink. For one embodiment, the time zone defaults to the one in which the greatest amount of transactions occurred; times from other time zones will be normalized to this time zone. In one embodiment, there is a control 625 above the panning widget allowing the user to change the default time zone used by the panning widget 620. In another embodiment, parallel instances of the thumbnail will be drawn for each time zone from which transactions originated. One panning widget extends across all of the thumbnails. In a different embodiment, the transcript view elements being thumbnailed are color-coded according to initiating actor rather than time of day. In yet another embodiment, these items are color coded by topic.

"Rainbow" View

To visualize really large volumes of discussions, or individual messages, a different approach to the visualization is necessary. FIG. 11 is a screen shot showing one embodiment of the activity graph for a discussion. The user has selected this view of the discussion using the tool bar 810. This view shows the level of activity over time in two ways: as a line graph 1120, and as a diagram 1125 in which levels of communication activity are denoted by colors of the rainbow. In this embodiment, a legend 1130 explains the meaning of the colors. An icon 820 and vertical dotted line 835 indicate the occurrence of a significant event (in this case, a board meeting). A toolbar 815 and navigation mechanism 830 as shown in FIG. 8, are also shown. A slider 1115 allows the user to create a different viewable span on the canvas.

The rainbow view uses a color, pattern, or similar distinguishing mechanism which uses the color spectrum to help users to discern small shifts in the communication activity of a very large population of actors. Specifically, this view is used to pinpoint the amount of communication on specific topics. It is accompanied by a graph below which allows the assignation of numerical values to the colors used in the spectrum view. Maximum density is determined by historical values over the same time span and same or comparable population.

Activity Graphs

Activity graphs are used to illustrate the amount of communication among a small set of actors over a user-specified period of time. They may optionally be additionally constricted by topic. Actor sets may be specified in any of the following ways:

- Manual specification of particular actors through the user interface.
- Manual specification of one or more actors, with the checkbox enabled to include the "circle of trust."
- Manual specification of one or more aggregate actors which may then be expanded in the view.

FIG. 12 is a screen shot showing one embodiment of the activity graph for a discussion. Lines 1220 linking actor images 545 are terminated with boxes 1215 showing the number of communications that took place between the actors. In one embodiment, each actor is represented by both an image or other icon 545 and a text item 1205 containing the name of the actor. A legend 1225 shows the mapping between colors and levels of communication activity. For each pair of actors, where actor A has sent more communications to B than B has sent to A, the connecting line 1220 has two colors, and the portion of the line adjoining each actor represents the number of communications sent by that actor to the other actor of the pair. Where each of the two actors has sent a comparable number of communications to the other, the line 1220 connecting the two actors has a single color throughout its length. A number 1215 at each end of each connecting line shows the exact number of communications that the actor at that end of the line 1220 has sent to the actor at the other end of the line 1220. The user can invoke a communication profile popup window 1210. In one embodiment the popup window 1210 is invoked by double-clicking on the line 1220 connecting actor images 545. The popup window 1210 provides additional data about the communications, including average communications length and depth, and document types exchanged. For one embodiment, any anomalies noted by the system are also flagged.

Referring to FIG. 12, Each individual or aggregate actor is represented by an image provided or selected by the user. There is at most one line 1220 connecting any two actors in the activity graph. For one embodiment, a single line is used to indicate all communication between actors, in both directions. The direction of the arrows at the ends of the line indicate which way the communication is flowing. The number in the box 1215 embedded in the arrow indicates the number of communications to the other actor. For individual actors, these are the communications to that actor specifically, as opposed to communications sent to various distribution lists. If an aggregate actor is included in the display, all such aggregate communications are included, since such aggregate actors often correspond to distribution lists. Note that for purposes of readability, only communication between pairs of actors is shown. In order to show communication between tuples of actors, aggregate actors may be created.

The coloring of the lines is used to indicate one of the following, depending on how the user has configured the user interface:

- Whether the amount of communication to this actor relative to other individual actors during the same period of time is unusually high or low.
- Whether the amount of communication to this actor is high or low relative to what has historically been the case (presuming that comparison data exists.)
- Whether the amount of communication to this actor as a fraction of total communication to other individual actors is high or low compared to what has been true historically.
- Whether the amount of communication is high or low relative to a particular workflow process, or informally, among teams of similar size working on similar projects, either contemporaneously, historically, or both.

In one embodiment, the color or pattern of the line indicates the frequency of communication, while the thickness of the line indicates the volume of communication. In another embodiment, the thickness of the line indicates the frequency of communication, while the color or pattern of the line indicates the volume of communication.

The number of communications can be based on any or all of the following, depending on how the user has configured the user interface:

- Email
- Instant Messages (IM)
- Phone calls

If for some reason, the user has specified an actor who is totally unconnected to the other actors in the display, the icon for that actor will have no lines attached to it.

The activity graph can be superimposed on an org chart in order to highlight communication flows that appear to differ from the org chart. In this event, actor titles are listed, and additional lines to indicate reporting relationships may be rendered. It can also be used as a visual querying tool; the user may select two or more actors in order to see all of the discussions, or individual communications between them. The user may also click on the line connecting any 2 actors in order to bring up a panel 1210, shown in FIG. 12, containing the communication profile of these actors. Which information to display is user-configurable, but would typically include the following:

- Average depth of communication
- Average interval between successive communications, optionally calculated bi-directionally
- Breakdown of communications by time (for example if the graph spans the period of one year, the communications would be broken down by the month)
- Document types exchanged
- Average length of communication
- Change from immediately previous observation period of same length
- Anomalies
- Ontologies which trap it Overview Graphs FIG. 13 is a screen shot showing one embodiment of one view of a discussion timeline. Sets of adjoining rectangles 1305, linked by lines 1310 and color-coded by actor (as shown in legend 1315), are used to represent the communications within a discussion (so that each discussion appears as a set of adjoining rectangles 1305). The x-axis of the screen represents the timeline, and the sets of rectangles are arranged one above the other on the y-axis as in a Gantt chart. Above each discussion 1305 appears that discussion's title 1320. The lines 1310 show related discussions, which are generally either precursors to, or offsprings of, the current discussion.

The purpose of the overview graph, shown in FIG. 13, is to show a set of discussions which occurred approximately contemporaneously. These graphs are one of the possible types of output from a query. In one embodiment, each discussion appears as a rectangle 1305 of the length appropriate relative to its duration in the timeline. The title 1320 of the discussion appears directly above the rectangle; in some embodiments, this is followed by the number of items in the discussion. The rectangles are thumbnails of the content part of the transcript view of the discussion, scaled down to the necessary size and rotated 90 degrees to the left. Specifically, each item within the discussion is coded according to one of the following, depending on the user's preference:

Initiating actor
Topic
Document or communication or event type

The graphic resulting from this is then scaled to the appropriate dimensions and then placed on the chart. Note that an arbitrary number of discussions may be so rendered on this graph; the view simply becomes longer along the Y axis.

In addition, the user may configure the user interface to color code all communications originated or received by a particular actor of interest. In one embodiment, numerous parallel thumbnails may be created in a dedicated view in order to help the user observe the overlap between different actors of interest.

As there may be significant time lags between events in some discussions, in some embodiments, a bounding box is used to help indicate that all of the items in question are members of the same discussion. Connecting lines between discussions are used to depict forks in discussions. Similarly to the participant graph, events and other objects may be added to the graph. Zoom controls allow the resolution to be changed; the different visual representations of days, nights, and weekends/holidays may also be used here.

FIG. 14 is a screen shot showing one embodiment of another view of the discussion timeline. In this view, four discussions 1405 are displayed, and the level of activity within each discussion is represented by vertical lines 1415 of various thicknesses, where a thicker line denotes a greater level of communication activity. A panning widget 1410 over one portion of a discussion magnifies the vertical lines in the portion of the display under the widget 1410. The user can move the panning widget 1410 by mouse manipulation. In one embodiment, when the user does so, a hand icon 1420 appears on the panning widget 1410. An icon 820 and vertical dotted line 835 indicate when a significant event occurred.

In another embodiment, the discussion names appear to the left of the view, and one discussion occupies all of the real estate in that range of the Y axis.

For viewing smaller numbers of discussions, FIG. 15 depicts a timeline of the individual events in a discussion. FIG. 15 is a screen shot showing one embodiment of another view of the discussion timeline. In this view, detailed information about each individual communication event 1505 is arranged along a discussion timeline 505. Communication events 1505 are depicted as blocks on the chart (in one embodiment, different types 1530 of events are depicted using distinctively colored or patterned backgrounds). Each block depicting an event 1505 contains header information 1520 related to the corresponding communication, including but not limited to: the sender or creator of the communication; the person who last modified the communication; the date of the communication; the subject of the communication; and any associated attachments or linked documents. In one embodiment, the user can click on an area 1510 of each block in order to display the content of the communication. Color-coded lines 1525 linking each event denote the primary type of evidence used by the system to incorporate that particular item into the discussion. A zooming tool 1535 at the top right of the screen allows the user to zoom in (to show less communications in more detail) or out (to show more communications in less detail). In one embodiment, the background area 1515 of the chart is color-coded or coded with a distinctive pattern to represent daytime and nighttime.

FIG. 15 provides an overview of the constituent parts of a discussion and the connections between them. Communication events are depicted as sets of interconnected blocks 1505. The blocks 1505 may be color-coded as elsewhere described; actor icons may be optionally included in the block. The different colored lines 1525 reflect the primary type of evidence used by the system to incorporate that particular item into the discussion. Evidence types include but are not limited to, the following: similarity of participants, "reply to", lexical similarity, pragmatic tag, same attachment, and workflow process. These terms are explained in 'An Apparatus for Sociological Data Mining'.

Another variation of this view uses clustering to group whole discussions together, connecting different clusters by the appropriately colored lines, as shown in FIG. 16. FIG. 16 is a screen shot showing one embodiment of a discussion cluster view. In this view, the total number of discussions meeting certain user-specified criteria is reflected in the size of the shape (in this embodiment, a circle) representing the cluster. In one embodiment, the shape that currently has the focus (is selected by the user) is displayed in a distinctive color 1635, with a distinctive pattern, or is shown enlarged, thereby distinguishing it from circles 1610 that do not have the focus. Links 1615 between clusters are color-coded according to whether the clusters share: commonality of actors, commonality of topics, or commonality of another type. Commonality of actors occurs when two clusters, distinctive from each other by virtue of meeting different clustering criteria, nevertheless share the same set of actors. Where this is the case, a distinctive color is used to trace the link between the two clusters in question. Icons allow the user to see more information 515, the date and time 520 of the communication, and to view 525 the underlying document discussion. A separate, smaller, window 1630 allows the user to navigate within discussion space by moving a panning tool 1620. In one embodiment, when the user activates the panning tool 1620, a hand icon 1625 is displayed.

In this view, shapes 1610 are used to represent groups of discussions. The shapes 1610 are labeled with the number of discussions contained in that group, and a description of the group. In one embodiment, a smaller window 1630 shows a map of the entire discussion space, or a relatively large part thereof, and contains a smaller frame 1620 to represent the area of discussion space under analysis. Since this view is independent of the information content, it is suitable for use even when the information has been strongly encrypted, and thus is not accessible for analysis.

Document Trail Graphs

Document trail graphs depict the life cycle of one particular document. FIG. 9 is a screen shot showing one embodiment of the document trail graph for a discussion. Each cluster of items on the graph consists of one actor icon 905 and at least one document icon 935. The actor's actions with regard to the document (such as creation, modification, check-in, etc) are represented by displaying a document icon 935 in an appropriate color or pattern, according to a legend 930. The x-axis of the graph represents the time line, with dates shown along a timeline display 505 at the bottom of the graph, and lifecycle increments 910 displayed along the top. In one embodiment, at each stage of the document trail, the length of the document in pages is indicated by a number 925 inside the document icon. Links 915 between versions of the document are color-coded according to function. In one embodiment, hovering the mouse over the 'more info' icon 520 invokes a popup 920 summarizing data related to the document in question.

A timeline 505 allows the user to see the date and time at which a particular event 935 in the document's life occurred. An actor icon 905 denotes the actor responsible for said event 935. Events 935 are depicted as clusters of activity comprising document icons 925 and an actor icon 905. Links 915 between the various versions of the document that comprise a single event are color-coded according to function. Document revision numbers 910 (for example, but not limited to, source control system revision numbers, or revision numbers assigned by the present invention) are displayed along the x-axis of the graph. Document icons 925 are color-coded according to the type of user activity that triggered the event. Examples of said user activity include, but are not limited to, document creation, modification, revision, deletion, check-in, check-out, distribution, viewing, third-party transfer and content transfer. In one embodiment, a legend 930 explaining the color-coding is superimposed on the graph.

Document trail graphs further show icons allow the user to see more information 515, the date and time 520 of the communication, and to view 525 the underlying document. Hovering the mouse over (in one embodiment, clicking) the 'more info' button 515 displays a popup 920 containing a summary of information related to the event in question. In one embodiment, document icons 925 contain a count of the number of pages (or other size metric) contained within the document at the time of the event 935 in question.

Money Trail Graphs

The purpose of the money trail graph, shown in FIG. 10, is to chart the movement of money using data available within a discussion. This visualization displays information related to money transfers that have been extracted from a discussion. The data is displayed along a timeline 505. Each extracted data point in the money trail includes a financial institution 1010 or money manager, at least one actor 545 party to the transaction, and a sum of money 1005, if that data is available. Links 540 connecting the elements of a financial transaction are color-coded according to transaction type following a color code specified in a legend 1025. Hovering the mouse over the 'more info' icon 520 beside a link 540 invokes a popup 1015 summarizing data related to the financial transaction. An account icon 1020 allows the user to see which financial accounts are involved in the transaction.

Any transactions within a discussion that relate to money transfers, whether they are merely documents discussing the transfer, or documents that in themselves constitute the instruments of transfer, are used to build a money trail graph. The graph displays actors 545 (whether individuals, groups, or organizations) and the financial institutions 1010 who are involved with the transfer. Color-coded links 540 between actors denote the type of transaction, and are explained in one embodiment in a legend 1025.

Transcript View Variations

The basic transcript view, shown in FIGS. 18 to 25, is a linear presentation of the causally related communication events that make up a discussion. Communications 1830 are displayed in chronological order, and relevant metadata is displayed at the top of each communication. The metadata includes, but is not limited to: date and time created, saved or sent; subject; recipient list; and time (in one embodiment, time is denoted by a clock icon 1815.) Actor names 1820 are color-coded. A header area 1805 provides information related to the discussion, including (but not limited to) discussion title, message count, list of participants, date range and total number of attached documents (in one embodiment, the total number including duplicates; in another embodiment, the total number of distinct attached documents). In one embodiment, an actor image 545 is associated with each communication, to denote the actor who created or changed the document. Clickable links 1810 contain the names of any attachments, and open the corresponding attachment when clicked. A display tool 1825 at the top-right of the screen allows the user to show or hide message headers, quoted text within each message, or message content. Communications may further provide document-type coding: for example, by pattern or color coding.

A sequence of documents 1830 (or other communication events, such as instant messages 2525) is displayed beneath a discussion header 1805. In one embodiment of the invention, the discussion might be augmented by external events, either manually by the user through the user interface, or via an automated process defined for a specific case. In one embodiment of the invention, this view consists of a user-configurable summary portion at the top, followed by a list of the various items in the discussion. Each item has an author or creator, and optionally a set of other participants, such as those actors appearing in the cc: line of an email. As shown in FIG. 18, for one embodiment, each actor 1820 is automatically color-coded by the system. Since the number of actors in any given corpus can be arbitrarily large, and there are a finite number of variations in color that the eye can readily distinguish, color coding of actors is done relative to the individual discussion. However, actors of particular interest can be assigned colors that are to be used globally. In other embodiments of the invention, colors are recycled by the system within non-intersecting sets of actors. Each item also has a title, a date, and an item type, such as: email, meeting, document modification, etc.

In one embodiment of the invention, shown in FIG. 19, activity associated with each actor is represented in a horizontal bar 1905 containing colored areas 1910, where the areas are color-coded by actor and spaced to represent time intervals.

In one embodiment of the invention, shown in FIG. 20, discussion partitions 2005 are displayed. The partitions 2005 represent the threads that make up the discussion. In one embodiment, the partitions 2005 include the number of communications in each thread of the discussion. In this embodiment, discussions that have been partitioned (for example, because they are so large or complex) can be accessed by clicking on the title of the partition 2005.

In one embodiment of the invention, items of different types are displayed with different background colors or patterns 2110, as shown in FIG. 21. In one embodiment, document type is shown via the use of an icon. In one embodiment, the time of day that a message was sent is shown by an icon 2105.

In one embodiment of the invention, as shown in FIG. 22, any attachments associated with communications in the present discussion are flagged via distinctive icons 2205 in the header or in the communication body. In one embodiment of the invention, documents linked by reference to communications in the present discussion are flagged via distinctive icons 2210 in the header or in the communication body. Examples of documents linked by reference include, but are not limited to: a document whose URL is referred to in a communication; and a data file whose file name and path is referred to in a communication. In one embodiment, clicking on the icon displays the attachment.

In one embodiment, shown in FIG. 23, quoted text 2320 is distinguished. In one embodiment, the background 2315 is color coded. In another embodiment, the text 2320 itself is color-coded. In one embodiment, within each communication that contains quoted text, each distinct quote is assigned a timestamp 2310. The communication header area contains explanatory text 2305 stating how many pieces of quoted text are associated with the current communication. In one embodiment, the explanatory text 2305 is replaced by an icon.

To make it easier for the user to immediately discern the time of day that an event occurred, in one embodiment, a clock icon 1815 as shown in FIG. 18 appears that is set to the time that the event occurred. In other embodiment, an icon indicating general time of day appears. For example, a document modification that occurred at night would have an icon with a partial moon against a dark backdrop with stars, while an email sent at dawn would have a rising sun. In one embodiment, in addition to color coding the actors, their picture 545 appears at the top of each item that they created, as shown in FIG. 18. In cases where no actor image is available or desired, a user-selected graphic can be used in its place.

The summary portion 1805 contains the discussion timeline, participating actors, number of items, and controls which allow certain information to be viewed or hidden. In one embodiment of the invention, the discussion timeline is represented graphically (FIG. 17) as a series of headers 1705 connected by color-code lines 1710. In order to view message content, the user clicks on a command button, hyperlink or active area of the header. This includes, but is not limited to, transport and other header information in emails, quoted text from a prior email, routing information for a wire transfer, and check-in messages to document repositories. One embodiment of generating the summary or resolution is described in 'An Apparatus for Sociological Data Mining'.

Optional UI tools include controls to "fast forward" to the next item created or otherwise involving particular actors. This, like the panning widget, which is also used with this view, is especially useful for long discussions which have many participants associated with them.

In one embodiment, shown in FIG. 24, items that are or are suspected to be missing from a discussion are flagged visually. A deleted item 2415 can be flagged in any or all of several ways: the background 2420 has a distinctive color or pattern, or is otherwise displayed in a distinctive way; a red flag icon 2425 is displayed on the item; a text box 2405 displays additional information including but not limited to the computed level of certainty that an item was deleted, and the computed level of suspicion associated with the deletion; a "torn document" effect 2410 graphically conveys to the user that this discussion is incomplete. For one embodiment, only suspicious deletions are flagged.

An item may have been deleted, yet leave traces behind of its prior existence. A simple example of this is the case in which message B was a reply to message A, but message A itself no longer exists other than what is to be found in the header and content information of message B. There are two subcases of interest related to this:

The case in which a great deal of information about A—possibly all—can be reconstructed from other sources.

The case in which only the suspected existence of A can be posited by the system, but virtually no other information is available.

These two cases differ considerably in their treatment in the user interface, since in the former case, the main consideration of interest is to inform the user that he is seeing reconstructed and/or partial information. For example, in the above example of message A and message B, the header of information of A would be lost, so there would be no way of knowing who had been cc'ed on A. Thus, in a reconstructed version of A in a transcript view, the "cc:" line content would contain a colored block containing question marks, or another representation of the user's choosing. For one embodiment, the item itself has a grayed out background color, and in one embodiment, a broken zig-zag line across it.

The latter case by definition presumes that there is no content available to display. An example of this would be references in other documents to a document that there is no independent evidence of; for example, a link that no longer resolves. In that instance, the available information is displayed in the appropriate location in the template. In one embodiment, a certainty factor, as shown in box 2405, of the system's belief that the document ever actually existed may also appear.

In some situations, the question of whether the deletion (or suspected deletion) of the data was either legal in the context of a given matter, or was in compliance with some defined standard of behavior is of interest. One embodiment of a system for making this determination is described in copending application Ser. No. 10/358,793, filed concurrently herewith, and entitled "A METHOD AND APPARATUS TO PROCESS DATA FOR DATA MINING PURPOSES." Once the determination has been made that the deletion of an item is possibly suspect in a given instance, the system will flag the item. For one embodiment, a red flag icon 2425 is used. Missing information is noted in bold red text. The background color of the item will be set to whatever the user's preference is for displaying this kind of item, for example a background containing a tiling of question marks 2420, as shown in FIG. 24.

In the case of the various graph views, suspected deletions are handled similarly:

Items which were suspiciously deleted will have an icon.

Items which were partially or largely reconstructed from other forensically available sources are shown with a zig-zag line across them or have a zig-zag line icon above or to the side of them.

Items whose content could not be reconstructed at all would bear a red question mark icon.

FIG. 25 is a screen shot showing one embodiment of the transcript view of a discussion, focusing on instant messages 2525 within the discussion. Actors 2515 are color-coded, and time-stamps 2520 are shown at regular intervals. A slider 2505 at the left of the screen allows the user to navigate through the set of instant messages, as does a vertical scroll bar 2535 to the right. The slider 2505 at the left of the screen additionally shows a panning tool 2510 representing the position of the visible portion of instant message text within the larger body of text. Note that for instant messages (IMs) 2525, a simpler item form is used, where IMs 2525 are displayed in chronological order and timestamped 2520 at regular intervals. A panning tool 2505 with a slider 2510 allows the user to navigate through the IMs 2525. In one embodiment, the user can also navigate using a conventional scrollbar 2535. The same form may also be used to represent emails in a condensed format in which data about additional participants is not deemed of interest. In such cases, the view is constructed by decomposing the emails into the separate text blocks attributable to each actor, and then linearizing them by time (accounting for differences in time zone.) In another embodiment, all contiguous communication from the same actor is presented in the same item, separated by line breaks, much like the traditional form of a play dialog.

Querying Tools

In order to help facilitate the iterative querying that is so essential when the user is confronted with an arbitrarily large and unfamiliar corpus of documents, an extensive querying language is provided. For one embodiment, this language reflects the actor orientation of the document analysis engine that is described in 'An Apparatus for Sociological Data Mining' patent. Since it is well known that the vast majority of searches contain one or two keywords, and no operators, it is important for the query language for "discussions" to break away from this standard, but ineffective paradigm. This is accomplished by using a sequential structuring of the query information. It is assumed that the majority, but not all, of queries performed with the query language will be one of the following forms, or subsets of the forms described below.

In FIG. 32, the query is of the format: who 3205 (actor/actor group) knew/probably knew/saw/believed/asserted 3210 (verb relationship) what 3215 (topical or specific document instance or version) when 3220 (time, timeframe, or timeframe relative to a particular event). Optionally, the query may specify how 3225 (for example, via pager, mobile device, desktop machine) or where 3230 (if it is possible on the basis of the electronic evidence to place the person geographically at the time of the communication) for the communications as well.

In FIG. 33, the who 3205 is narrowed by adding additional features. Thus, the query may include, with what frequency 3305 (for example, once, repeatedly) an actor, did what 3310 (for example, edit or check-in a document, delete a document, commit a pattern of actions or single action 3305, such as excluding particular other persons from meetings or discussions, etc), what object 3315 (actor 3205 and/or content 3215) did they do this to, and when 3220.

In FIG. 34, the user can specify how 3310 did patterns of behavior (relationship between an object 3215 and an actor 3205 or content 3215) change over a specified period of time 3220, or with respect to some other specific context 3405. For example, the user can query how the patterns of communication between two litigants changed after a particular material event. The user may further query if there any relationship of statistical significance between the occurrences of events of particular tuples of event types, and if so, what kind.

For one embodiment, the language generally requires that an actor be specified prior to any other terms. In the event that the actor is immaterial to the query, an actor of "anyone" may be specified, or may be automatically inserted by the system. Individual actors can be specified by first name and last name; if only one or the other is provided, the system will look in the recent command history for that user in an attempt to disambiguate it. If nothing suitable is found, the system will try to match the string to both actor first and last names present in the corpus. It will then present a list of appropriate choices, or if there is only choice echo it back to the user for confirmation. An actor's circle of trust can be specified by adding a plus sign "+" after the actor's name. In the case of an aggregate actor, the union of the actors in the different circles of trust is taken. Similarly, an actor group, such as the set of all employees of ACME Corp. could be specified. Similarly, in one embodiment, certain personalities of a given actor (or actors) can be specified.

Next, the language uses an operator. For one embodiment, if the operator is omitted, it will be interpreted to mean "knew" or "asserted". There are two main classes of operators, those involving content creation or observation, and those that do not. Operators may be active or passive in nature relative to the actor. For example, modifying a document is active, while getting promoted to a higher position is passive. Content modification operators include, but are not limited to, the following:

Asserted: There is text attributable to a particular actor that contains the assertion in question.

Had reason to believe: This has to do with what knowledge the actor had, on the basis of the electronic record, in the face of omissions. For example, if there were 5 versions of a document prior to it being finalized, but a particular actor was only privy to the initial 4, he might not be aware of the existence of the $5^{th}$ version. So, he might reasonably believe that the $4^{th}$ revision was the final one.

Knew: The actor actively engaged in discussion about the topic(s) in question.

Probably Knew: The actor's membership in a particular circle of trust suggests that even absent specific electronic evidence, that the actor probably was aware of a particular thing.

Saw: The actor in question saw an instance of the content in question. That the actor saw it is established by either their responding to, or commenting on the material. Other evidence of "saw" includes, but is not limited to, any logged access of a document containing this content.

May Have Seen: There is relevant content that the actor may have seen, but there is no direct evidence that he saw it. For example, the fact that person A sends person B an email cannot reasonably by itself be construed as person B reading this email, at all or in its entirety.

All of the above also have negations, which may be specified by the use of either "not" or a minus sign. Non-content operators include employee lifecycle events such as Hire, Departure, Transfer, Promotion, and Role Change. Other non-content events include, but are not limited to: Vacation or leave of absence or sick day, Travel event, Wire transfer send or receive, or Phone call, presuming no transcript of the phone call exists.

"When" may be specified as any of the following:

Absolute time, using any of the standard date/time formats.

Time of day (day, night/evening, morning, afternoon, after hours)

Day of week (or weekday, weekend)

Holiday or work day or vacation day or one or more specific actors "out of town" as gauged from online calendars and HR system information.

Note that all time information is implicitly actor-relative. Differences in time zones, national holidays, and even what is considered "after hours" are addressed. Therefore a "when" phrase is interpreted according to what is true for the greatest number of actors specified in the query. If a different behavior than this is desired by the user, she may explicitly bind the "when" term to either an actor or a specific location. For example:

1:00 PM in London

Holiday in France

Evening for Linda Holmes

If "when" is not specified, it is presumed to mean:

The lifespan of the actor specified in the query, if only one actor is specified.

The interval of time beginning with the earliest lifespan in the actor group specified in the query, and ending with the latest lifespan (or current date/time,) if an actor group were specified.

The intersection of actor or personality lifespans as specified in the query, if communication among different actors is required by the query The "how" may optionally be specified as either a specific device type, such as a Blackberry, or as a category of device, for example a mobile device. The "how" could also be a fax or a voicemail, or a paper letter. In one embodiment, the "how" is identified by its immediately following an unquoted "by" or "via."

The "where" may be optionally specified by entering the geographic location of the actor at the time of their participation in the particular transaction. This can be done hierarchically, if a tree of locations is provided. If there is more than one actor specified in the query, the where is modified by actor. In one embodiment, this is specified as <actor name> in <location> or <actor name> at <location>.

Because of the highly iterative nature of large corpus querying, any of these operators can be iterated on by either reducing or expanding their scope. As described in 'An Apparatus for Sociological Data Mining', for one embodiment, the core engine calculates the primary limiting factors in a query. The information is used to indicate to the user which terms are responsible for very substantially reducing or expanding the result set. To facilitate the appropriate use of such iteration, the system can optionally inform the user on which terms could be generalized or specialized one level further for best effect on the results set. In one embodiment, these alternate queries are run automatically on separate threads at the same time as the base query, in order to facilitate an immediate response to a user question, such as a request for "more" or "less."

Content or "What" Operators

Each of the operators below can be used in the context of retrieving discussions or individual communications, or both. These may be used to override the system defaults described previously. For one embodiment, the actual retrieval behavior of these operators is determined by the current relevance scoring mechanism in place. One example of such relevance scoring is described in 'An Apparatus for Sociological Data Mining'.

Keyword (an operator 3510): Result set contains all discussions or communications with at least one occurrence of a specified term, depending on the context in which it is used. This operator can specify sets of terms through techniques including but not limited to use of wildcard characters and matching using the Levenshtein edit distance.

Phrase (an operator 3510): Result set contains all discussions or communications with at least one occurrence of the sequence of terms. This operator can specify sets of related phrases using techniques including but not limited to the use of wildcard characters in individual terms, matching by Levenshtein edit distance between terms and matching by Levenshtein edit distance between sequences of terms.

Classifier (an operator 3510): Result set specified by the set of sub-queries obtained from expanding a given class from an ontology loaded into the document analysis engine.

NamedEntity (an operator 3510): Result set specified by the query obtained from expanding a given named entity from all ontologies loaded into the document analysis engine.

InDiscussionOnly (a document type 3505): Return only results from discussions

InSingleDocOnly (a document type 3505): Return only singleton documents that are not members of any discussion.

Evidence Operators

The second group of operators search over metadata collected from each individual communication as well as relationships between documents created during the evidence accrual process while building discussions. These operators return discussions when applied.

CommunicationType: Returns all discussions containing certain types of communication items, for example email.

EventType: Returns all discussions that contain an event of a particular kind, such as a board meeting.

Event: Returns all discussions that contain a particular instance of an event, for example, the board meeting that occurred on Mar. 15, 2001.

WithItemRelatedToQuery: Will return all discussions containing communications that are a match for a query, regardless of other parameters.

WithSimilarEvidenceLinks: Will return all discussions with a certain frequency or statistical distribution of evidence links of specific kinds.

HaveRevisions: Returns those discussions that have more than one version (i.e., have at least one revision due to the subsequent addition of further evidence.)

PragmaticTag: Returns any discussions containing one or more items with the given pragmatic tag.

Multi-Discussion Operators

The third group of operators search over metadata collected from each discussion as well as relationships between discussions. These operators return discussions when applied.

WithSimilarProperties: return discussions containing a distribution of properties of contained documents. For instance "discussions where most communications sent after hours".

WithSimilarActors: discussions containing specified set of actors, actors can be marked as primary, regular, observer or passive participant. For example:

primary:<joe rudd>.

WithSameWorkflow: return all discussions that are an instance of the given template. Templates include formal and informal workflows, etc.

RelatedDiscussions: return discussions related to the given discussions, for example, offspring.

The fourth group of operators search over inferred sociological relationships between communications in a discussion. In general the discussions which contain communications with the indicated relationship are returned.

ActorRelations: return discussions with the indicated relationship between a set of actors, cliques ("circles of trust") or groups. Relationships include but are not limited to: "between", "among", "drop", "add", "exclude." Some of these operators optionally use a ternary syntax: <joe rudd> excludes <bob jones> (see 'An Apparatus for Sociological Data Mining' for an explanation of these items)

ActorStatistics: return discussions with a statistical relationship between an indicated actor and others. For example "most frequent correspondents with ActorX"

Topology: return discussions with a given topology, for example: "split" "merge"

Resolution: return discussion with a given resolution

Damaging: return discussions with damaging actors. Primarily useful in combination with other queries.

The fifth group of operators are combinatorial operators used to combine result sets of subqueries. The conventional logical operators have a different effect when applied over discussions.

REQUIRED
PROHIBITED
( )-nesting
[ ]-suppress ontology expansion

Other Operators

DiscussionMember: Takes a set of individual documents and returns the set which are members of one or more discussions. The negation may be used in order to retrieve the complement set. Used with—statistics, it will calculate various statistics on the differences between the member and non-member documents.

DiscussionProperties: Used on one or more discussions, queries against the total number of communications/events, types, the maximum depth, overall duration, frequency of communications, topics, actors, etc.

ExpandToDiscussions: return the set of unique discussions containing at least one document from the document set. The document set is obtained from the result set of a subquery.

A specific graphical querying tool is also provided, in addition to the views that serve double-duty as visual query builders. As depicted in FIGS. 29-31 and 37*a-c*, the query tool includes a text field that users may use to enter words, phrases, or ontology names. Optionally, a separate pane to specify ontologies (similar to the ontology selection drop-down list 3715 shown in FIG. 37*a*) using a tree to select the desired items may be displayed, as well as a view indicating which ontology hits correlate with which others—for example content discussing tax evasion and travel frequently co-occurring—also allowing the desired ontologies to be selected and added to the query.

FIG. 36 depicts another visual query means using a Venn diagram representation to indicate how many documents were "hit" by a particular ontology, or by a combination of particular ontologies. A series of interlocking circles 3620 represent the extent to which communications "hit" only one, or more than one, ontology. The interlocking circles 3620 are used to indicate how many documents have been found to reside within each of three categories, as shown in the single-category total 3605. It also shows the number of documents that reside in more than one of the three categories, as shown in the multiple-category total 3610. In this embodiment, an explanatory text 3615 prompts the user to click in the relevant portion of the Venn diagram in order to see the corresponding documents. Using this view, users may click on any bounded area of the diagram. Doing so will bring up a panel containing a relevance ranked list of either individual documents or discussions, depending upon the user's preference. In the event that the user clicks on an area that is the intersection between two or more ontologies, in one embodiment, the relevance ranking scheme will be altered to favor documents that have a substantial score for each ontology in question.

This view is also used in thumbnail form in order to show how the topic relative proportions changed due to the addition of new documents to the corpus. This is done both by showing "before" and "after" thumbnails, as well as displaying thumbnails side by side of each segment of the data set (however the segments are determined by the user) so that their topic content may be easily compared. A similar representation can be constructed on the basis of actors rather than ontologies; further both actor and ontology information could be combined in one Venn diagram view.

Returning to FIGS. 29-31, in the query tool, individual and aggregate actor icons 2910 are provided in the search panel, though actor names may also be typed in the text field 2905. Users may specify which icons should appear; initially by default the system will select the ones with the greatest communication frequency. Subsequently, by default, it will display the actors who appear most frequently in queries. Additional options allow the exclusion of the specific actors; if an actor has been excluded, the icon representing him will have an "X" or diagonal bar superimposed in it, similar to the symbol used in prohibition signs, as shown in FIG. 31.

For one embodiment, events of global interest 2915 are added to a catalog so that they are displayed in the query tool for easy access. Additionally, a date range may be specified using standard calendar selection controls 2920. For one embodiment, events of interest will also appear in the calendar 2925 by coloring the square for the particular date(s) in question. Double-clicking on a colored square will bring up a pop-up with a description of the event. If an event is selected, the user will be asked whether they want the query to be:

Prior to the event

Subsequent to the event

Within a specified period of time before or after the event

During the event

If the calendar controls have been used and one or more events have been selected, the system will treat this as a request to include the union of these times. However, in this case, those discussions corresponding to the time specified by events will be given a higher relevancy ranking on the dimension of time.

In one embodiment, shown in FIG. 30, the querying tool allows the user to specify, through the use of check boxes 3010 in what way an actors must have been involved with each document in order for the document to be considered responsive to the query. Examples of the involvement include, but are not limited to: creating, changing, reading, seeing, and/or receiving a document. In one embodiment, also shown in FIG. 30, the querying tool allows the user to select pre-created, saved queries 3005. Possible mechanisms for selecting the saved queries include, but are not limited to, drop-down list or combo boxes (as shown in FIG. 30) and list boxes. In one embodiment, the user can specify that only discussions involving certain personalities of an given actor should be returned.

After the user hits the "go" button, the query will be echoed back to the user. In some embodiments of the invention all queries, however specified, are echoed back to the user in front of the result set. This is done using query templates, such as those specified in FIGS. 32-34. Specifically, using the example of Template 1 (FIG. 32), in one embodiment of the invention, the echo is constructed by concatenating the following pieces of data:

"Query on:"<actors><actions performed><content descriptors><time>

For example:

"Query on Joe Smith or Bob Jones modifying spreadsheets last quarter"

In some embodiments, each query template has a corresponding natural language phrase that is used to generate the echo. In such embodiments, the above would be expressed as:

"Did Joe Smith or Bob Jones modify any spreadsheets last quarter?"

Since numerous query options may be specified, use of an echo helps compactly confirm what the user has asked for. This may help users to understand the result set returned, especially if the user erred in some way. Further, the text of the echo may optionally be saved with the results sets, making it easy for other users to immediately interpret the results set.

The converse also holds true; in some embodiments of the invention, the user may enter natural language queries, and the system will interpret these queries by matching them to the appropriate query template and then performing any necessary word mapping via the use of ontologies.

Additional query options include, but are not limited to, the following:

Discussion length (number of items)
Discussion length (calendar duration)
Discussion depth (number of items on same topic)
Containing events/communication of specific types The above-mentioned discussion length query options include (but are not limited to) the longest or shortest discussions (both by number of items and calendar duration) among a given set of actors, or on a given topic. The ability to target the longest or shortest discussions by actor provides a targeted tool for probing the activities of specific actors of interest, without being restricted to particular topics or content. This is important because such restrictions limit the user to finding only what he already thinks may be there, leaving potentially important or interesting information unrevealed.

As is the case with the query language, the GUI tool will provide the user feedback on which terms caused the query (on a relative basis) to over-generate or under-generate.

The user may also avail herself of a number of canned query templates. These include, but are not limited to, the following:

Did <this> actor receive <this> version of <this> particular document?
Were there any unusual peaks or troughs in communication activity between <these> actors?
Find the longest discussions during <these> actors during this period of time
<Who> discussed <this> topic the most?
<Who> discussed <this> topic at all?
<Who> was in <this> actor's circle of trust, when?
Show any instances where communication circumvented the org chart.
Show any instances where an unexpected person modified a document.

All such questions are accompanied by a UI template which allows the user to select the instances of actor, document, topic (ontology) or time interval as appropriate to fill in or extend the template.

The user may configure the interface to display one or more of a number of different kinds of views in response to a query. In one embodiment, the default view is a tabular listing of the discussions that are responsive to the query, relevance ranked accordingly. This table may include all of the following information, plus any additional information that has been programmatically added:

Discussion Name (as determined by the core engine)
Discussion Profile (includes such information as the number of items, kind of items, number of attachments.)
Lifespan (interval of time from the beginning of the first transaction in the discussion to the last)
Summary, as described in 'An Apparatus for Sociological Data Mining'
Resolution, as described in 'An Apparatus for Sociological Data Mining'
Primary Participants
Specific participants (indicate which actors of special interest were in any way involved in the discussion, even very peripherally.)
Ontologies (which ontologies trapped content in the discussion)
Missing Items (whether the system has detected evidence that some of the items that were once part of the discussion are now absent—and if so, how many such items there are.)
Revision history (As noted in patent 'An Apparatus for Sociological Data Mining', a discussion may be revised due to the incorporation of additional data from new data sources that had previously been unavailable. In some embodiments of the invention, it may also be modified manually by an administrator with the appropriate level of privilege.)
Retrieval & viewing history (How many times this discussion has been retrieved in a query, how many times it was actually viewed or annotated.)

As elsewhere in the system, by default the images used to represent the actors are used in order to facilitate rapid visual scanning of the results, as shown in FIG. 26. FIG. 26 is a query results view showing actor images. Each line of the results view shows the discussion title 2605, discussion start date 2610 and end date 2615, and a button 2625 depicting the image and name of each actor involved with the discussion. In one embodiment, clicking on the button displays information related to the actor. In one embodiment, only the actor image is displayed on the button. In another embodiment, only the actor name is displayed on the button. In one embodiment, a non-clickable image or text box is used, rather than a button. In one embodiment, only primary actors are shown. In one embodiment, only certain personalities of an actor are shown. The discussion is displayed by clicking on the relevant line in the results view, or by highlighting the results view line and clicking the 'Display Discussion' button 2620. In one embodiment, a text summarization of the discussion is displayed on the relevant line in the results view.

The user may also opt to have the discussions returned from a query visualized in a matrix view, shown in FIG. 27, in which the columns represent a variety of discussion properties extracted from the user's query. For example, if there were 20 actors participating in all of the discussions returned by a particular query, each one would be represented by its own column, as would be other properties, such as communication type, which relevant ontologies "hit" it, and so on. Each discussion 2710 is displayed in its own row, and each property 2705 that it has, such as the participation of a particular actor causes the relevant square to be colored in. Different fill colors may be used in order to indicate whether the actor was a primary actor in the discussion, just an actor, or merely a passive participant. This is depicted in FIG. 27 in compact form (without use of the actor images.)

In addition the user may choose to save a number of queries and their results in a particular location, so that this data may be displayed together, as pictured in FIG. 28. In one embodiment, saved queries are displayed in a list, where each item is identified by a folder icon 2850, to convey to the user the fact that it may be expanded. When expanded, a results list 2835 containing relevant discussions and their associated actors 2840 and date range becomes visible.

A folder icon 2850 is used to represent each query, and the textual content 2855 of the query is displayed to the right of the folder icon. The first query is shown expanded, revealing the results list 2835. Descriptive icons 2815, 2820, 2825 and 2830 appear to the left of each saved query. Clicking on the icon representing a pencil 2820 allows the user to annotate the query; a green rectangle next to the pencil icon indicates that the query has already been annotated. Clicking on the icon representing a hard drive 2830 saves the query to the local machine. The document icon 2815 at the left becomes replaced with the initials of the last user to modify the data (shown as 'TU' in this figure). The folder icon 2825 is used to add a discussion to a bin or folder of the user's choosing. For each saved query, a list of any relevant discussions 2805 and communications 2810 is shown. In one embodiment, such items show the list of actors 2840 involved, and the date range 2845 of the relevant discussion.

For one embodiment, individual or "singleton" documents are displayed separately from discussions. Furthermore, for one embodiment, saved data may be annotated (by clicking on the pencil icon,) saved to a local hard drive (by clicking on the hard drive icon,) or placed in one or more particular bins (by clicking on the folder icon to see a list of options that may be selected,) and that the initials of the user who last manipulated the document are included.

Finally, for users for whom even this simplified process might seem onerous, in one embodiment, a discussion finding "wizard" is provided. This wizard follows the sequence of operators indicated in the section on the querying language. Effectively it decomposes the controls in the illustration above into several individual, simpler panels while providing the user inline help information. The first panel asks about actors; the second asks about events of interest, the third about important words or phrases, and so on.

QBE (Query By Example)

QBE refers to a set of techniques whereby a user provides an exemplar of what she is looking for in lieu of constructing an explicit query. FIGS. 37*a*-37*c* are screen shots of a series of Query by Example (QBE) windows. This refers to the type of query in which an exemplar of the desired returned object is specified by the user. In the case of discussion objects, QBE becomes a more complicated issue than it is with regular documents. As can be seen in 'An Apparatus for Sociological Data Mining' application, discussions have large numbers of properties, the importance of which may shift according to use case. In other words, there is no simple, one size fits all similarity metric for discussions. For example, if discussion A contains the same 3 topics as discussion B, but shares only one actor with it, and shares the same group of actors with discussion C with which it has one topic in common, it is unclear which of B or C would be considered to most similar to A. The first QBE window, shown in FIG. 37*a*, therefore allows the user to choose from among a plurality of properties. The properties include (but are not limited to): actors 2910, content terms or phrases 2905, topics 3705, content type 3710, ontology 3715, and time range 3720.

The second window, shown in FIG. 37*b*, contains a set of discussion properties that can be considered as evidence in determining similarity. The set shown can be selected by the user from the full set of discussion properties (except for unique ID). In addition, one embodiment of the invention provides the default set 3725 of discussion properties, pictured in FIG. 37*b*. The colored rectangles 3735 represent the relative importance of each of the discussion properties. In one embodiment, using the modified cursor 3740, the user may modify the sizes of the different colored rectangles 3735 in the box at the bottom of FIG. 37*b*. Since the size of the box is fixed, enlarging one box proportionally reduces the sizes of the others. By repeated resizings of these rectangles, the user can achieve whatever relative scoring amongst these different factors they wish. In one embodiment, this relative scoring information is saved by the system, and will be the default setting until the user changes it again. Alternatively, a pie chart may be used, in a similar manner. Alternatively, the user may select relative importance numerically by percentage, or using some other tool. In one embodiment, the user may name and save different settings, as different settings may be useful for different use cases. The system provides the following functionality in this regard:

As depicted in FIG. 37*a*, the user may enter a combination containing all or some of the following query items: topic, document type, ontology, time range, and actor. The system will return a results list containing all discussions that meet this combination of criteria. In one embodiment, the combination of parameters entered by the user can include certain personalities of a given actor.

A user may right-click on any graphical representation of a discussion in any of the previously described views in order to bring up the menu item "Find Similar". This will bring up a window according to the user's configured preferences displaying the discussions returned by the query.

A user may right-click on any graphical representation of an individual textual communication, for example, the rows in a table representing singleton documents returned in response to a query, in order to locate other documents that are similar both contextually and by themselves. This will bring up a two-tabbed view, one with discussions, and one with singleton documents.

As pictured in FIG. 37*a*, the user may enter a document containing text into the system in order to use its contents as input to the query engine. As described further in 'An Apparatus for Sociological Data Mining', all named entities, including actors, will be extracted from the document. In one embodiment, a topic analysis will be done via the use of ontologies and pragmatic tagging, known text blocks will be sought, and finally any mention of dates will be extracted. One example of this usage is depositions in a litigation context.

Discussions have large numbers of properties including, but not limited to, the following:

Actors
Primary Actors
(Regular) Actors
Observers
Number of organizations
Number of Items
Number of Item Types
Item Types
Lifespan
Length
Number of Partitions
Topics
Pragmatic Tagged Items
Revisions As a result, there is potentially considerable ambiguity as to what exactly it means to say that one discussion is "similar" to another, and therefore should be returned in a QBE query. Further, the desired behavior of the QBE mechanism may vary by application. However, in one embodiment, the default behavior is to consider that actor and content are the two key items in the weighting; all other properties merely impact the ranking of the discussion in the result set. Specifically, actor is expanded first to any actor with the same role or title in the same organization as the actor(s) provided in the exemplar, and then to any actor in the same organization. Content may be determined by ontology or pragmatic tag, with the former being given more weight. Discussions that contain the desired actors or content under this definition are returned. For one embodiment, results are relevance-ranked according to the scheme laid out in 'An Apparatus for Sociological Data Mining'.

If the user wishes a different behavior, he may pull up the Advanced Options panel as shown in FIG. 37*b*, and specify the relative weight that he wishes to assign to each property, and whether or not the value of the property is to be treated strictly as specified in the exemplar. For example, must the exact actors in the exemplar be present in order for a discussion to be retrieved, or does it suffice if their colleagues in the same department are present? In one embodiment, the relative weights are assigned with a weighted scale (i.e., a scale that has both numbers and words, for example 5=must be the case; 1=desirable to be somewhat similar.) In another embodiment, shown in FIG. 37*b*, the colored rectangles 3735 represent the relative importance of each of the discussion properties. In one embodiment, using the modified cursor 3740, the user may modify the sizes of the different colored rectangles 3735 in the box at the bottom of FIG. 37*b*. Since the size of the box is fixed, enlarging one box proportionally reduces the sizes of the others. By repeated resizings of these rectangles, the user can achieve whatever relative scoring amongst these different factors they wish. In one embodiment, this relative scoring information is saved by the system, and will be the default setting until the user changes it again. Alternatively, a pie chart may be used, in a similar manner. Alternatively, the user may select relative importance numerically by percentage, or using some other tool. In one embodiment, the user may name and save different settings, as different settings may be useful for different use cases.

With this information, the system performs the query. In order to help the user make sense of the ranking of results in FIG. 37*c*, the property or properties primarily responsible for the rank are shown 3750 (in one embodiment, properties are color-coded, and the coding is explained in a legend 3745 below the results). For example, as pictured in FIG. 37*c*, the initial item was scored highly primarily on the basis of shared terms. If the high score were also attributable to shared actors, a blue chit would also appear. In some embodiments of the invention, the degree of saturation of the color chit is used to express the relative level of similarity in this dimension. In one embodiment, the user sees a warning message 3755 if the result has been broken down into clusters.

The user may configure the view to show any of the available discussion properties. Similarly, in one embodiment, he may resize and reorder the various columns via direct manipulation.

Filtered Viewing of Discussions

Using standard information retrieval techniques, those items within the discussion that are relevant to the user's query may be identified and visually highlighted. The user may opt to have all portions of a discussion that are not responsive to their query be minimized. In the case of a transcript view, non-responsive items would be condensed to a single header line, with a button that can be clicked on in order to expand the entry in order to make its contents visible.

Certain actors who may generate a considerable volume of data may nevertheless generate very little content of interest. If desired, the user may specify that all communications originating from such actors are by default minimized in any views of the discussion.

Object Lifecycle Views

These views differ from the previously described ones in that they are less actor-focused and more object-focused. These views are intended to depict the history of a particular document (or other electronic data object) as it moves from creation, to distribution, various modifications, changes in form, extractions or copy/pastes to other documents, and possibly deletion. Such views can be extremely important in investigative contexts, when a particular document becomes the focus of attention.

FIG. 38 depicts the lifecycle view for a document. If versioning information is available from a document management system or repository, or if the creating application provides it, the versions are shown by number 915 above the view, with vertical lines extending beneath them to help make it clear which actors modified or received a document before, or after a particular version change. Major versions and minor versions can be represented differently as per user preference; minor versions may be omitted from the display entirely, represented by thinner lines and smaller number boxes, or drawn the same as major versions. Other designations may be added by the user manually, or extracted automatically from systems that contain such information. These designations include, but are not limited to, published, shipped, and produced. The legend panel 3825 indicates the color coding of some of the different kinds of possible lifecycle events. The lifecycle view is drawn according to a left to right timeline. However, as is also the case with the participant graph, the actor icons only need be drawn in approximately the correct location with respect to the timeline. This is for purposes of readability; drawing a separate actor icon for related actions that may have taken place only moments apart from one another would only serve to decrease the readability of the visualization. However, an additional actor icon will be drawn if it is necessary to do so in order to not combine events which occurred on opposite sides of a version line. Therefore to capture such information, each actor icon is framed by a frame that can be partitioned up to 8 times in order to indicate the occurrence of different events performed by the actor on the document within a fairly short period of time. For example, an actor might check out a document, modify it in some way, email it around to various people, and then check it back into the repository—all within a matter of a short period of time. In this event, the actor frame would have 4 colors, one side each, in whatever colors designated by the legend. With the color scheme pictured below, this would be: orange, red, blue, and yellow.

In order to "drill down" for further information, the user may click on an actor icon in order to view a detailed log of events represented by that instance of the actor icon. Clicking on any part of the frame will bring up a pop-up with a detailed description of that action. For example, in the case of a check-in, the detailed description would include all of the following information (if available)

Timestamp of check-in

Check-in message

Other files modified as part of same check-in (if any)

List of those actors receiving check-in notification

Resulting version number

Check-in verification ID

In addition, the user may click on the clock icon above the actor icon in order to see a simple chronological list with exact timestamps of the events represented by that actor icon instance. As in other views, the "?" icon may be used to access other kinds of information as specified in user preferences.

As depicted in FIG. 38 below, individual actors may be filtered out of the view, either entirely removed from the display, or else grayed out significantly as shown below. Individual action types may be similarly treated. For example, a user may not care who checked-out or received a document, but rather may be interested in only those persons who modified the document or sent it outside of the organization.

Mobile, Voice & Related Applications

As usage of new types of user interfaces becomes more widespread, the system will need to not only absorb data that is captured through such interfaces, but also provide its output to users who rely on these modalities. Examples of the types of interfaces to be considered in this regard are: speech recognition and text-to-speech (either as stand-alone applications or in conjunction with telephony technologies), handheld devices such as those using the PalmOS (FIG. 39) or WindowsCE operating systems, mobile telephones equipped with browser interfaces such as iMode or WAP and potentially other devices using specialized data transmission protocols and/or specialized embedded operating systems.

Speech recognition is already widely used by the legal and medical profession for recording of briefs, reports, and the like. The system includes a means of extracting data that is input by speech recognition, and making such data searchable and retrievable like any other artifact. Input to speech recognition can take the form either of speaker-dependent recognition (the type employed by dictation software) or speaker-independent recognition (the type employed by telephony applications); the system includes adapters to incorporate data from both types of systems.

Furthermore, the system may utilize speech recognition as an interface allowing users to query data already in the system. To this end, an interactive voice interface to the system could display discussions and other data to the user, either on a device or through an audio-only interface. For applications using speech recognition as input mechanism, an auditory interface is commonly used to play back data to the user, be it for playback over a telephone or through speakers attached to another device such as a desktop computer. To this end, in one embodiment, the system includes auditory interfaces, including but not limited to: playback of indexed documents by text-to-speech, or spoken synthesis that accompanies or parallels any of the visual diagrams generated by the system.

Further remote interfaces for the system may include wireless and handheld display and input to the system, for example through WAP or similar protocols that transmit data over wireless networks (including telephony networks), input of data via Short Messaging System (SMS) or similar protocols, the use of downloadable/syncable views and data input for handheld/palmtop/tablet PCs, and interfaces for wearable computing devices. The system allows both input and retrieval of data into the system through any combination of devices; for example, a user's spoken query will be displayable on the screen of a handheld device.

Mobile and voice applications are most useful as query interfaces to the system for users who find themselves away from office systems but nonetheless require system access. However, the provision for data input by mobile or voice interfaces also means that "live" updates to a system can be made remotely, and that secondary sources of information (on-the-spot interviews, court proceedings, live news feeds) can be incorporated into the system in the absence of other indexing and content extraction processes. This topic is dealt with in further depth in 'An Apparatus for Sociological Data Mining'.

For voice applications in particular, a natural language interface is a highly desirable mode of interaction with the system. Users who are limited to an auditory interface (where the input to the system is spoken rather than textual) can respond better to systems that are designed around the vagaries of human speech (which include disfluencies, variable noise conditions, and the strictly linear exchange of information). The nature of auditory interfaces is such that spontaneity and a tolerance for garbled input is incorporated into the interface; rather than scripted, fixed input that can be manipulated visually, the voice interface must attempt to parse ambiguous user input and return a "system appropriate" result.

Typically, speech recognition interfaces rely on a grammar that restricts potential user utterances in order to provide accurate recognition. In a spoken query interface to the system described in this patent, highly accurate utterance recognition is unlikely, but need not be a hindrance to proper function. By allowing the system to accept unstructured utterances and subsequently to construct a range of hypotheses about their content, a much more usable type of interface results. With an unstructured grammar, any possible user utterance can generate a fixed-length set of possible parses. From this set of potential parses, an algorithm is applied to account for phonetic similarities in homophones, to remove content that occurs in only a few parses, and so forth, leaving a "core" hypothesis that can be used as the basis for a search.

As an example, the user utterance, "Find me anything about fraud" might generate the following hypothesis set from a speech recognition engine:

"find me a thing about fraud"

"find my anything about frog"

"find me knee thing up out fraud"

. . . and so forth.

While none of the generated parses is entirely correct, the phonetic similarity of many items in the resulting set can be used to generate a normalized "core" hypothesis that finds the commonly occurring substrings such as "find/fine" "me/my", "anything/a thing/knee thing", "about/up out", and "fraud/frog". Normalization of this set of results can proceed according to relatively simple natural language heuristics: those words that are essentially contentless, such as "find me anything", can be omitted, leaving the core terms "about fraud", which can be encoded, for example, as a set of Boolean search queries like "contents: fraud OR contents: "about fraud". Once the queries are generated, a preliminary result set can be relayed to the speaker by voice interface, allowing of course for additional refinement or correction of the query, as well as for more detailed display/playback of user-selected elements of the result set. For one embodiment, the system may repeat the query as understood to the user, permitting the user to either confirm the query or to repeat the query to modify it.

FIG. 39 is a screen shot showing one embodiment of the discussion view, as used on a mobile device. A list 3920 of returned discussions is shown, each of which is associated with a checkbox 3915 allowing the user to select the discussions in order to view further detail. In one embodiment, the query 3910 that caused the list 3920 of discussions to be returned is displayed. In one embodiment, a group of buttons 3905 allows the query to be launched or interrupted.

Case Management Application

One of the applications of the system is case management in a litigation context. The functionality previously described can be delivered inside a case management application. As pictured in FIG. 40, the master window in this application allows the viewing of both individual documents and discussions in their various visual manifestations. FIG. 40 is a screen shot of one embodiment of the case management master window. In the top-left pane 4005, the user can select from among various types of communications 4045 (and, in one embodiment, the actors who sent communications), or can select discussions 4050. Documents are displayed in the top right pane 4010. In this example, the top right pane 4020 shows a privileged document, which is flagged 4015 as such. At the bottom right pane 4035, the user can enter text in order to find specific discussions, documents, or actors. The bottom-left pane 4030 is used to bookmark searches to which the user wishes to return. A group of option buttons 4040 allows the user to select between management of discussions, documents, or actors, and a set of command buttons 4025 allows the user to select different views of the data. This window contains the following functionality of interest:

Allowing users to browse by document type, which is calculated either by file extension or by pragmatic tagging, and to drill down first by actor and then by topic, or vice versa, as well as by discussion membership.

Documents, including discussions may be marked as "privileged" causing the red privileged stamp to always appear over the document in electronic form, and to be printed when the document is printed.

The user may search for a word or topic in discussions, according to the actors to whom the words or topic are attributable, or in individual documents.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method of visualizing information comprising:
   providing a visualization of actor communications in the context of one or more discussions, a discussion including at least one actor and at least two causally related documented communications;
   wherein the documented communication may be one or more of the following: a document, an email, an instant message (IM), a facsimile, a voicemail, a phone call, a wire transfer, a fund transfer, or an electronically traceable package; and
   wherein a thickness of the line indicates a number of communications between the actors.

2. A method of visualizing information comprising:
   providing a visualization of actor communications in the context of one or more discussions, a discussion including at least one actor and at least two causally related documented communications; and
   said method further comprising time-of-day icons which denote the time of day at which the communication was created, wherein the time-of-day icons are color based.

3. A method of visualizing information comprising:
   providing a visualization of actor communications in the context of one or more discussions, a discussion including at least one actor and at least two causally related documented communications;
   wherein the visualization comprises an activity graph that visualizes a level of activity over time related to large volumes of discussions, or individual messages; and
   wherein a rainbow view uses a color spectrum to help users to discern small shifts in the communication activity of a large population of actors, and to pinpoint the amount of communication on specific topics.

4. A method of visualizing information comprising:
   providing a visualization of actor communications in the context of one or more discussions, a discussion including at least one actor and at least two causally related documented communications.
   wherein the documented communication may be one or more of the following: a document, an email, an instant message (IM), a facsimile, a voicemail, a phone call, a wire transfer, a fund transfer, or an electronically traceable package; and
   wherein a number at a first end of a line represents a number of communications sent by a first actor to a second actor, and a number at a second end of the line represents the number of communications sent by the second actor to the first actor.

5. A method of visualizing information comprising:
   providing a visualization of actor communications in the context of one or more discussions, a discussion including at least one actor and at least two causally related documented communications;
   wherein the documented communication may be one or more of the following: a document, an email, an instant message (IM), a facsimile, a voicemail, a phone call, a wire transfer, a fund transfer, or an electronically traceable package; and
   wherein a color of a communication line between two actors shows a communication density.

6. A method of visualizing information comprising:
   providing a visualization of actor communications in the context of one or more discussions, a discussion including at least one actor and at least two causally related documented communications;
   wherein the visualization is a discussion timeline in which sets of adjoining rectangles, linked by lines and coded by actor represent the communications within a discussion.

7. The method of claim 6, further comprising displaying a legend identifying each actor code.

8. A method of visualizing information comprising:
   providing a visualization of actor communications in the context of one or more discussions, a discussion including at least one actor and at least two causally related documented communications;
   wherein a transcript view is a linear presentation of the causally related communication events that make up a discussion; and
   wherein quoted text within a document is color coded for an originating actor.

9. A method of visualizing information comprising:
   providing a visualization of actor communications in the context of one or more discussions, a discussion including at least one actor and at least two causally related documented communications;
   wherein a transcript view is a linear presentation of the causally related communication events that make up a discussion; and
   wherein items which are suspected to be missing from a discussion are flagged visually.

10. The method of claim 9, further comprising:
    determining if a deleted document is suspicious, and if so, flagging the deleted document indication in the transcript.

11. A method of visualizing information comprising:
    providing a visualization of actor communications in the context of one or more discussions, a discussion including at least one actor and at least two causally related documented communications; and
    providing a query tool to construct queries for related documents;
    wherein colored rectangles with a fixed size represent a relative importance of each property of the discussion.

* * * * *